US008626614B2

(12) United States Patent
Barber et al.

(10) Patent No.: US 8,626,614 B2
(45) Date of Patent: *Jan. 7, 2014

(54) SYSTEM AND KIOSK FOR COMMERCE OF OPTICAL MEDIA THROUGH MULTIPLE LOCATIONS

(75) Inventors: William H. Barber, Thousand Oaks, CA (US); Philip J. Tomasi, Newbury Park, CA (US)

(73) Assignee: Redbox Automated Retail, LLC, Bellevue, WA (US)

( * ) Notice: Subject to any disclaimer, the term of this patent is extended or adjusted under 35 U.S.C. 154(b) by 1097 days.

This patent is subject to a terminal disclaimer.

(21) Appl. No.: 11/584,865

(22) Filed: Oct. 23, 2006

(65) Prior Publication Data

US 2007/0050266 A1 Mar. 1, 2007

Related U.S. Application Data

(60) Division of application No. 09/903,444, filed on Jul. 9, 2001, and a continuation-in-part of application No. 09/578,631, filed on May 25, 2000, now Pat. No. 7,444,296.

(60) Provisional application No. 60/216,854, filed on Jul. 7, 2000.

(51) Int. Cl.
*G06Q 10/00* (2012.01)
*G06Q 30/00* (2006.01)
*G06F 7/00* (2006.01)

(52) U.S. Cl.
USPC ............ 705/28; 705/26.1; 705/26.9; 700/213

(58) Field of Classification Search
None
See application file for complete search history.

(56) References Cited

U.S. PATENT DOCUMENTS

| 4,598,810 A | 7/1986 | Shore et al. |
| 4,608,679 A * | 8/1986 | Rudy et al. ................. 369/30.43 |

(Continued)

FOREIGN PATENT DOCUMENTS

| JP | 407182659 | 7/1995 |
| JP | 11-5599 | 2/1999 |

(Continued)

OTHER PUBLICATIONS

Office Action dated May 27, 2009, U.S. Appl. No. 11/584,981, 13 pages.

(Continued)

*Primary Examiner* — Asfand Sheikh
(74) *Attorney, Agent, or Firm* — Perkins Coie LLP

(57) ABSTRACT

A kiosk dispenses and receives recorded optical media using an interconnected central server, through an Internet Service Provider. The central server has databases and processing capabilities and is connected to a credit verification system. The databases collect inventory administration information and customer data (e.g., credit card information and email addresses) from the kiosks. The central server initiates credit verification, sends receipts to customers via email and maintains databases for remote inventory control and administration of the kiosk network. A kiosk may identify a recorded disk for automated restocking and perform quality assessment of a recorded disk. The kiosk may provide publishing-on-demand or act as a portal for remotely served advertisements. The kiosk preferably includes a rotatable carousel with a selection of DVDs. A digital camera captures a digital image of a disk barcode and internal software rotates the image to "read" the barcode, to control inventory and access issues.

17 Claims, 25 Drawing Sheets

(56) References Cited

U.S. PATENT DOCUMENTS

| | | |
|---|---|---|
| 4,789,045 A | 12/1988 | Pugh |
| 4,812,629 A | 3/1989 | O'Neil et al. |
| 4,814,592 A | 3/1989 | Bradt et al. |
| 4,839,505 A | 6/1989 | Bradt et al. |
| 4,839,875 A | 6/1989 | Kuriyama et al. |
| 4,858,743 A * | 8/1989 | Paraskevakos et al. ........ 194/205 |
| 4,866,661 A | 9/1989 | de Prins |
| 4,872,154 A | 10/1989 | Sakagami et al. |
| 4,893,705 A | 1/1990 | Brown |
| 4,896,024 A | 1/1990 | Morello et al. |
| 4,903,815 A | 2/1990 | Hirschfeld et al. |
| 4,915,205 A | 4/1990 | Reid et al. |
| 4,967,403 A | 10/1990 | Ogawa et al. |
| 4,995,498 A | 2/1991 | Menke |
| 5,007,518 A | 4/1991 | Crooks et al. |
| 5,013,897 A | 5/1991 | Harman et al. |
| 5,028,766 A | 7/1991 | Shah |
| 5,088,586 A | 2/1992 | Isobe et al. |
| 5,095,195 A | 3/1992 | Harman et al. |
| 5,107,667 A | 4/1992 | Tone et al. |
| 5,133,441 A | 7/1992 | Brown |
| 5,159,560 A * | 10/1992 | Newell et al. ................. 700/215 |
| 5,273,183 A | 12/1993 | Tuttobene |
| 5,319,705 A | 6/1994 | Halter et al. |
| 5,418,713 A | 5/1995 | Allen |
| 5,445,295 A | 8/1995 | Brown |
| 5,459,306 A | 10/1995 | Stein et al. |
| 5,576,951 A | 11/1996 | Lockwood |
| 5,633,839 A | 5/1997 | Alexander et al. |
| 5,644,727 A | 7/1997 | Atkins |
| 5,647,505 A | 7/1997 | Scott |
| 5,685,423 A | 11/1997 | Hunt |
| 5,699,262 A | 12/1997 | Lang et al. |
| 5,715,403 A | 2/1998 | Stefik |
| 5,724,521 A | 3/1998 | Dedrick |
| 5,739,512 A | 4/1998 | Tognazzini |
| 5,748,485 A | 5/1998 | Christiansen et al. |
| 5,761,071 A | 6/1998 | Bernstein et al. |
| 5,769,269 A | 6/1998 | Peters |
| 5,822,216 A * | 10/1998 | Satchell et al. ............... 700/232 |
| 5,822,291 A | 10/1998 | Brindze et al. |
| 5,826,267 A * | 10/1998 | McMillan ............................ 1/1 |
| 5,844,808 A | 12/1998 | Konsmo et al. |
| 5,848,593 A * | 12/1998 | McGrady et al. ............. 128/897 |
| 5,850,442 A | 12/1998 | Muftic |
| 5,860,362 A | 1/1999 | Smith |
| 5,875,110 A | 2/1999 | Jacobs |
| 5,900,608 A | 5/1999 | Iida |
| 5,934,439 A * | 8/1999 | Kanoh et al. ................... 194/205 |
| 5,938,510 A | 8/1999 | Takahashi et al. |
| 5,943,423 A | 8/1999 | Muftic |
| 5,950,173 A | 9/1999 | Perkowski |
| 5,956,876 A * | 9/1999 | Burdette et al. ........... 40/606.02 |
| 5,971,273 A | 10/1999 | Vallaire |
| 5,988,346 A | 11/1999 | Tedesco et al. |
| 6,032,130 A | 2/2000 | Alloul et al. |
| 6,072,766 A | 6/2000 | Konshak |
| 6,109,524 A | 8/2000 | Kanoh et al. |
| 6,119,932 A | 9/2000 | Maloney et al. |
| 6,123,223 A | 9/2000 | Watkins |
| 6,169,483 B1 | 1/2001 | Ghaffari et al. |
| 6,182,857 B1 | 2/2001 | Hamm et al. |
| 6,201,474 B1 | 3/2001 | Brady |
| 6,209,787 B1 | 4/2001 | Iida |
| 6,264,104 B1 | 7/2001 | Jenkins et al. |
| 6,286,139 B1 | 9/2001 | Decinque |
| 6,289,322 B1 | 9/2001 | Kitchen et al. |
| 6,321,984 B1 | 11/2001 | McCall et al. |
| 6,327,230 B1 | 12/2001 | Miller et al. |
| 6,330,491 B1 | 12/2001 | Lion |
| 6,336,098 B1 | 1/2002 | Fortenberry et al. |
| 6,366,914 B1 | 4/2002 | Stern |
| 6,424,706 B1 | 7/2002 | Katz et al. |
| 6,434,326 B1 | 8/2002 | Kondo et al. |
| 6,493,110 B1 | 12/2002 | Roberts |
| 6,513,015 B2 | 1/2003 | Ogasawara |
| 6,539,417 B2 | 3/2003 | Stern |
| 6,554,184 B1 | 4/2003 | Amos |
| 6,584,450 B1 | 6/2003 | Hastings et al. |
| 6,688,523 B1 * | 2/2004 | Koenck .................. 235/462.06 |
| 6,702,540 B2 | 3/2004 | Olin |
| 6,748,296 B2 | 6/2004 | Banerjee et al. |
| 6,748,539 B1 | 6/2004 | Lotspiech |
| 6,758,370 B2 * | 7/2004 | Cooke et al. ................. 221/194 |
| 6,898,942 B2 | 5/2005 | Schanin |
| 6,954,732 B1 | 10/2005 | DeLapa et al. |
| 6,965,869 B1 | 11/2005 | Tomita et al. |
| 7,058,581 B1 | 6/2006 | Young |
| 7,085,727 B2 | 8/2006 | VanOrman |
| 7,162,434 B1 * | 1/2007 | Walker et al. ................... 705/14 |
| 7,234,609 B2 | 6/2007 | DeLazzer et al. |
| 7,313,692 B2 | 12/2007 | Weeks et al. |
| 7,444,296 B1 * | 10/2008 | Barber et al. ................... 705/17 |
| 7,747,346 B2 | 6/2010 | Lowe et al. |
| 7,774,233 B2 | 8/2010 | Barber et al. |
| 8,060,247 B2 | 11/2011 | Kaplan et al. |
| 2001/0011252 A1 | 8/2001 | Kasahara |
| 2001/0037207 A1 | 11/2001 | Dejaeger |
| 2002/0046122 A1 | 4/2002 | Barber et al. |
| 2002/0095680 A1 | 7/2002 | Davidson |
| 2003/0074106 A1 | 4/2003 | Butler |
| 2004/0064371 A1 | 4/2004 | Crapo |
| 2004/0243480 A1 | 12/2004 | Gross |
| 2004/0249711 A1 | 12/2004 | Walker et al. |
| 2005/0086127 A1 | 4/2005 | Hastings et al. |
| 2005/0267819 A1 | 12/2005 | Kaplan |
| 2009/0048932 A1 | 2/2009 | Barber |
| 2009/0139886 A1 | 6/2009 | Blust et al. |
| 2010/0325001 A1 | 12/2010 | Barber et al. |

FOREIGN PATENT DOCUMENTS

| | | |
|---|---|---|
| JP | 11-53638 | 2/1999 |
| WO | WO-0072160 A1 | 11/2000 |
| WO | WO-2006116112 | 2/2006 |
| WO | WO-2009032946 | 3/2009 |

OTHER PUBLICATIONS

Response to Office Action filed Jul. 27, 2009, U.S. Appl. No. 11/584,981, 12 pages.

Response to Office Action filed Nov. 20, 2009, U.S. Appl. No. 11/584,981, 14 pages.

Office Action dated Aug. 20, 2009, U.S. Appl. No. 11/584,981, 31 pages.

Phillips, Blockbuster form DVD video rental alliance in the U.S., AFX Europe, Sep. 9, 1998, 1 page.

Ingram Relaunches DVD Rental Kiosk Program, Updates Software Package, Video Store, vol. 20, No. 5, p. 8, Feb. 1, 1998.

Beauprez, Jennifer; Maker of Automated DVD-Sales Kiosks Targets College Students; Denver Post; Dec. 6, 1999, 2 pages.

Notice of Allowance issued Aug. 8, 2008, U.S. Appl. No. 09/578,631, 14 pages.

Supplemental Appeal Brief, U.S. Appl. No. 09/578,631, filed May 22, 2008, 5 pages.

Appeal Brief, U.S. Appl. No. 09/578,631, filed Apr. 18, 2008, 216 pages.

Notice of Appeal, U.S. Appl. No. 09/578,631, filed Feb. 19, 2008, 1 page.

Office Action dated Nov. 19, 2007, U.S. Appl. No. 09/578,631, 29 pages.

131 Affidavit & Exhibits in U.S. Appl. No. 09/578,631, filed Aug. 27, 2007, 163 pages.

Response to Office Action dated Feb. 26, 2007, U.S. Appl. No. 09/578,631, filed Aug. 27, 2007, 26 pages.

Office Action dated Feb. 26, 2007, U.S. Appl. No. 09/578,631, 27 pages.

Request for Interview, U.S. Appl. No. 09/578,631 and U.S. Appl. No. 09/903,444, filed Jan. 2, 2007, 1 page.

Response to Office Action dated Mar. 9, 2006, U.S. Appl. No. 09/578,631, filed Aug. 9, 2006, 38 pages.

(56) References Cited

OTHER PUBLICATIONS

Office Action dated Mar. 9, 2006, U.S. Appl. No. 09/578,631, 18 pages.
Appeal Brief, U.S. Appl. No. 09/578,631, filed Sep. 26, 2005, 45 pages.
Notice of Appeal, U.S. Appl. No. 09/578,631, filed Jun. 24, 2005.
Office Action dated Mar. 30, 2005, U.S. Appl. No. 09/578,631.
Response to Office Action dated Jul. 22, 2004, U.S. Appl. No. 09/578,631, filed Jan. 4, 2005.
Office Action dated Jul. 22, 2004, U.S. Appl. No. 09/578,631, 10 pages.
131 Affidavit & Exhibits in Application U.S. Appl. No. 09/578,631, filed Apr. 16, 2004, 68 pages.
Response to Office Action dated Jan. 2, 2004, U.S. Appl. No. 09/578,631, filed Apr. 16, 2004, 9 pages.
Office Action dated Jan. 2, 2004, U.S. Appl. No. 09/578,631, 12 pages.
Response to Office Action dated Aug. 6, 2003, U.S. Appl. No. 09/578,631, filed Nov. 6, 2003, 12 pages.
Office Action dated Aug. 6, 2003, U.S. Appl. No. 09/578,631; 10 pages.
Response to Office Action dated Dec. 19, 2002, U.S. Appl. No. 09/578,631, filed Jun. 19, 2003; 32 pages.
Office Action dated Dec. 19, 2002, U.S. Appl. No. 09/578,631; 16 pages.
Supplemental Response to Office Action dated May 8, 2002, U.S. Appl. No. 09/578,631, filed Nov. 8, 2002, 56 pages.
Response to Office Action dated May 8, 2002, U.S. Appl. No. 09/578,631, filed Nov. 6, 2002, 8 pages.
Office Action dated May 8, 2002, U.S. Appl. No. 09/578,631, 12 pages.
Appeal Brief, U.S. Appl. No. 09/903,444, filed Dec. 18, 2008, 50 pages.
Office Action dated Sep. 18, 2008, U.S. Appl. No. 09/903,444.
Appeal Brief, U.S. Appl. No. 09/903,444, filed Jun. 9, 2008, 271 pages.
Notice of Appeal, U.S. Appl. No. 09/903,444, filed Apr. 8, 2008, 1 page.
Office Action dated Jan. 8, 2008, U.S. Appl. No. 09/903,444.
Response to Office Action dated May 3, 2007, U.S. Appl. No. 09/903,444, filed Oct. 31, 2007, 25 pages.
Declaration of Jens Horstmann Under 37 CFR 1.132 with Exhibits, filed in U.S. Appl. No. 09/903,444, filed Oct. 31, 2007, 198 pages.
Office Action dated May 3, 2007, U.S. Appl. No. 09/903,444.
Response to Office Action dated Feb. 9, 2007, U.S. Appl. No. 09/903,444, filed Mar. 16, 2007.
Office Action dated Feb. 9, 2007, U.S. Appl. No. 09/903,444.
Response to Office Action dated Sep. 27, 2006, U.S. Appl. No. 09/903,444, filed Nov. 10, 2006.
Office Action dated Sep. 27, 2006, U.S. Appl. No. 09/903,444.
Request for Continued Examination, U.S. Appl. No. 09/903,444, filed Jul. 20, 2006.
Advisory Action dated Jul. 17, 2006, U.S. Appl. No. 09/903,444, 4 pages.
Response to Office Action dated May 2, 2006, U.S. Appl. No. 09/903,444, filed Jun. 30, 2006.
Office Action dated May 2, 2006, U.S. Appl. No. 09/903,444, 12 pages.
Amendment and Response with Statement of Substance of Telephone Interview, U.S. Appl. No. 09/903,444, filed Feb. 15, 2006, 22 pages.
Response to Office Action dated Dec. 29, 2005, U.S. Appl. No. 09/903,444, filed Feb. 7, 2006, 14 pages.
Office Action dated Dec. 29, 2005, U.S. Appl. No. 09/903,444, 12 pages.
Response to Restriction Requirement dated Sep. 23, 2005, U.S. Appl. No. 09/903,444, filed Oct. 4, 2005, 12 pages.
Restriction Requirement dated Sep. 23, 2005, U.S. Appl. No. 09/903,444, 6 pages.
Response to Office Action dated Apr. 26, 2005, U.S. Appl. No. 09/903,444, filed Jun. 24, 2005, 28 pages.
Office Action dated Apr. 26, 2005, U.S. Appl. No. 09/903,444, 7 pages.
Response to Office Action dated Oct. 6, 2004, U.S. Appl. No. 09/903,444, filed Jan. 21, 2005, 14 pages.
Office Action dated Oct. 6, 2004, U.S. Appl. No. 09/903,444, 7 pages.
Office Action dated Oct. 1, 2008, U.S. Appl. No. 11/584,981, 12 pages.
Response to Office Action of Oct. 1, 2008, U.S. Appl. No. 11/584,981, filed Feb. 2, 2009, 11 pages.
PCT/US2000/014398, International Search Report mailed Sep. 6, 2000, 2 pages.
U.S. Appl. No. 11/366,966, filed Mar. 1, 2006, Tomasi.
DVD-Play, Generation-3 Kiosk Flyer, Assumed published by Aug. 18, 2000, based on analysis of Internet Archive WaybackMachine, http://web.archive.org/web/20000818124625/http://www.dvdplay.net/how.asp and http://web.archive.org/web/20000818124432/http://www.dvdplay.net/rentamovie.asp, 3 pages.
Office Action dated Jul. 20, 2012, U.S. Appl. No. 12/853,114, 17 pages.
Office Action dated Oct. 13, 2011, U.S. Appl. No. 12/853,114, 13 pages.
Response to Office Action of Oct. 13, 2011, U.S. Appl. No. 12/853,114, filed Apr. 18, 2012, 11 pages.
Office Action dated Apr. 1, 2009, U.S. Appl. No. 09/903,444, 59 pages.
Letter withdrawing a Notice of Defective Appeal Brief, U.S. Appl. No. 09/903,444, mailed Jul. 8, 2008, 2 pages.
Selected Actions from File History of related U.S. Appl. No. 09/903,444 from filing to Sep. 27, 2006 Office Action, 203 pages.
Selected Actions from File History of related U.S. Appl. No. 09/903,444 from Nov. 10, 2006 Response to Present, 380 pages.
Notice of Appeal, U.S. Appl. No. 09/903,444, filed Jul. 2, 2009, 1 page.
Appeal Brief, U.S. Appl. No. 09/903,444, filed Sep. 1, 2009, 292 pages.
Examiner's Answer to Appeal Brief, U.S. Appl. No. 09/903,444, filed Nov. 30, 2009, 59 pages.
Reply Brief, U.S. Appl. No. 09/903,444, filed Feb. 1, 2010, 13 pages.
"DVDinsider: DVDPlay Debuts First U.S. Automated Entertainment Machine—AEM-", DVD News, Apr. 10, 2003, 2 pages.
Avery, Patrick, "Superstar Deployments", Self-Service World, Aug. 2007, 4 pages.
Decision on Appeal for U.S. Appl. No. 09/903,444, Appeal No. 2010-007450, Mar. 25, 2013, 28 pages.
Declaration of Jens Horstmann Under 37 CFR 1.132 with Exhibits, filed in Affidavit-submitted prior to Mar. 15, 2013, U.S. Appl. No. 09/903,444, filed Oct. 31, 2007, 6 pages.
Letter of Von Shows, CEO of Tejas Videos, Oct. 29, 2007, 1 page.
Seitz, Patrick, "Self-Serve Movie Rental Kiosks a Surprise Hit with Consumers: DVD Vending Machines Find National Audience, Put Pinch on Retailers", Investor's Business Daily, May 31, 2007, 2 pages.
Slania, Johnt., "Dominick's, Jewel Touting DVD Vending; Rental Kiosks to Feature Per-night Fee on Movies", Crain's Chicago Business, Mar. 19, 2007, 2 pages.
Canadian Office Action for Application No. 2,605,563, Apr. 8, 2013, 4 pages.
Extended European Search Report for Application No. EP10810691, Mar. 6, 2013, 8 pages.
Extended European Search Report for Application No. EP10815879, Apr. 2, 2013, 5 pages.

* cited by examiner

SYSTEM AND KIOSK FOR COMMERCE OF OPTICAL MEDIA THROUGH MULTIPLE LOCATIONS

RELATED APPLICATIONS

This application is a divisional application of U.S. patent application Ser. No. 09/903,444, filed Jul. 9, 2001 which claims priority to 60/216,854, filed Jul. 7, 2000 and is continuation-in-part of U.S. patent application Ser. No. 09/578, 631, filed May 25, 2000 now U.S. Pat. No. 7,444,296, each of which are incorporated herein by reference.

FIELD OF THE INVENTION

This invention relates to a method and apparatus for dispensing recorded optical disks, e.g., DVDs, employing computers and software. More particularly, this invention relates to a method and apparatus for providing automated retail distribution of recorded optical disks. Still more particularly, this invention relates to a method and apparatus for providing a freestanding distribution and retrieval system for recorded optical disks, which is linked to a central server computer using the Internet.

Problem

One method commonly used for distribution of optical recorded media is a retail outlet. A retail outlet may sell or rent the optical recorded media. A large optical media inventory is common at a retail location, and staff is required for sales, rentals and restocking. A building is required to house this inventory and to provide a retail location. A computer system is usually employed to track inventory of rentals and sales. A retail outlet for recorded media is very expensive to construct and operate. Because of these factors, there is considerable overhead required to run a rental or sales business for recorded media.

Another method of media distribution is a limited scale operation. A convenience store might offer a limited selection of items for sale or rent. However, staff is still needed for sales, rentals and restocking. A significant limitation of the retail distribution model for optical recorded disks is the overhead required to operate a business.

One way that retailers and manufacturers have sought to reduce costs is through electronic commerce (EC). A system of distribution using EC can reduce overhead associated with retail locations and with sales operations. In this type of business model a central warehouse or warehouses ship an order submitted via the Internet through the mail or using a private courier. The cost of operating a retail location is avoided with this business model. However, Internet-based distribution systems often have significant liabilities. One such liability is that a customer must wait for an order to be shipped from a warehouse location. Another disadvantage is that stock may not be available at the time the order is processed. If stock is unavailable, an order may be placed on back-order or the order may be canceled. Another significant disadvantage of an Internet-based distribution system is the impracticality for media rental. The rental business is one of immediacy; a customer will rent an item that is available immediately, but may not rent if it is not available immediately. A customer is much less likely to rent an item that is shipped after ordering, requiring days for delivery. In addition, once a customer is finished with a rented item it must be return-shipped to the distribution location.

An advantage of an Internet-based distribution, however, is that a customer may set up an account, pay electronically, and provide invaluable information to a retailer, wholesaler or the media industry. What is needed is an Internet-based distribution system that allows a customer instant distribution or retrieval of optical recorded media (e.g., DVD disks) that does not require a retail outlet with the attendant staff and other costs of doing business. In addition, there is a need to provide automated services for payment and quality assurance such that a distribution system is simple and inexpensive to construct and maintain.

SUMMARY OF THE INVENTION

The above and other problems are solved, and an advance in the art is made, through the invention by methods and systems for Internet-based automated distribution and collection of optical recorded disks.

A first aspect of the invention is the ability to provide automated distribution of optical recorded disks, such as DVD-type optical disks. A stand-alone automated kiosk serves as a distribution point for an integrated system of automated distribution linked via the Internet. The kiosk is an Internet-connected, electro-opto-mechanical system providing storage, maintenance, marketing and dispensing and retrieval of optical recorded disks. A carousel or shuttle system provides access to multiple media selections within the kiosk. Multiple kiosks may be connected to the system via the Internet for simultaneous use by users at different locations. Multiple kiosks may further be managed from a central location, such as to provide remote maintenance and efficient operation of commonly-owned multiple kiosks through multiple locations.

In one aspect, a user interacts with the system via a touch screen. The system software guides each customer through the process, preferably using linked pages connected to a database. A selection is entered on the touch screen to choose one or more items for rental or sale. The selections are added to a "shopping cart," or a temporary database represented on the display, that is approved by the customer. A credit or debit card or other membership information may be entered using a magnetic strip card reader or other device that imports the data to a verification module. Approval or denial of credit is accomplished via a local database, and/or via a connection to the system central server computer, and/or via a connection to banking services. If the credit or debit is approved, the on-going transaction is attached to a customer, approval for the price of the disk is entered, and a dispensing system is activated. A database then queries software for the requested item location. A carousel or shuttle system manipulates the media until it is aligned with the dispensing/retrieving slot. A door mechanism is activated to open, and a mechanism is activated to push the optical recorded disk partially out of the slot to make it available for hand retrieval by the customer. The disk is contained within a special case, preferably.

In another aspect, the invention provides for emailing transaction information to a customer. By way of example, during the disk dispensing operation, an option to receive an e-mailed receipt is given. The option contains a touch-screen keyboard pop-up for the purpose of entering email address characters and other data. A consumer enters an email address via the touch screen keyboard. Receipts may include transactional information as well as advertising and links to specific web sites. All receipts are given by e-mail reducing the expense of a kiosk since a hard-copy receipt printer is not required. Additionally, the system acquires e-mail addresses from customers allowing post transaction interaction while the consumer is on online. These receipts may also contain advertisements and promotional information as well as web links. These advertisements and promotions may be targeted to customers based on their profile data.

Optionally, users of a system of the invention may access the Internet to review one or more kiosks in the area, or elsewhere, so as to pre-locate a desired optical media for purchase or rent. Such users may enter email addresses and purchase information at a computer connected with the Internet, and hence with the system, to facilitate these operations; these users may then physically access an appropriate kiosk to obtain their chosen optical recorded media.

Yet another aspect of the present invention is the ability to receive returned optical recorded media to the system. The customer activates a return process by selecting "return rental" button from the touch screen menu or by presenting the disk to the system bar-code reader or optical sensor. The carousel or shuttle system positions to accept the disk at the opening. An initial sensor detects if the recorded disk belongs to the system and activates a door mechanism to allow placement of the recorded disk in the opening. If the recorded disk does not register as a system disk, the door mechanism will not allow the disk to enter the opening. Once registered, the individual code associated with each item is entered into the database and the position in the carousel or shuttle is stored. An open transaction is closed when the item is returned and logged in the database, or sold. The location of each item is stored in the database upon insertion through the return slot. Recorded disks are stored in case containers specific to the system; these cases may include certain lock and key structures that enable early identification of the case. Preferably, item-specific identifiers—e.g., barcodes—are present on the optical recorded media to further identity of the individual disk.

Still another aspect of the present invention is automatic restocking of the kiosk system. Customers return the optical recorded media to the system. A single-touch selection or sensor-activated initiation of the system starts the process. The kiosk system rotates the carousel into the appropriate alignment of the opening to the selected inventory slot. Once in the appropriate alignment, and upon recognition of the system-specific barcode, the door opens for acceptance of a cased recorded disk. As the case passes through, the door mechanism pivots to decline additional insertions until the system is ready. The location information is then stored in the computer, restocking information is downloaded to the central server, and the disk becomes available for subsequent rental or sale.

Optionally, users of the system in certain markets (i.e. airports) may elect for the ability to return the optical media to administration by means of a mail-back program. For example, business reply envelopes can be made available to users at the kiosk and, for an additional cost, can simplify the return process for the user (i.e. a one way commuter).

In one aspect, the invention provides a "thin client" optical media rental system. Each kiosk of the system is a thin client connected to a core server through the Internet. As used herein, "thin client" means that each kiosk provides basic electro-opto-mechanical functionality sufficient to perform the operations required at the kiosk; but the overall system intelligence resides at the core server. This aspect provides certain advantages to facilitate maintaining a plurality of connected kiosks dispensing an array of optical media (e.g., DVDs) at different locations.

In another aspect, the invention provides a special optical media housing, typically in the form of a DVD case, with a "lock and key" structure to facilitate automated rental returns. In a related aspect, each such housing has a sensor, e.g., a magnetic actuator, attached thereto; the kiosk senses the actuator to determine that the case belongs to the kiosk (or to one of a connected array of kiosks grouped or linked to the central server). Preferably, the case sensor is an optical sensor formed by a hole and a blocked zone; the kiosk picks up the right sequence to accept that housing to the kiosk. This process is sometimes called "pre-scanning" herein. In pre-scanning, the kiosk will not open its door to accept a housing with optical media unless the kiosk first detects the case sensor. Preferably, the kiosk door also remains closed unless the bar codes are read from the optical recorded media, as described below.

In another aspect, once the kiosk determines that the housing is acceptable, the kiosk scans at least one bar code on the optical media. Preferably, two bar codes are read, specifying a "group" association and an individual media identification. A "group" bar code specifies how one optical media may travel between kiosks (for example, one distributor may control several kiosks and yet permit returns to any of the kiosks). An "individual media identification" bar code may generally be a serialization of one DVD in an array of DVD disks.

In another aspect, the invention provides a bar code scanning process for accepting returned optical recorded media to one or more kiosks connected to a core server. An optical reader scans the optical media through a clear case housing. The case preferably has an indented zone in its center so as to clearly read the bar code(s) through the case. The process preferably performs multiple "reads" of the bar code(s) to ensure that the kiosk (and hence the system) correctly identifies the optical recorded media. In one aspect, the kiosk takes a digital picture of the media during the return process; it then attempts to read the bar code(s) from the digital picture. If unsuccessful, kiosk software "rotates" the image so as to read the bar code(s) from a different angle. This process may continue; but it is generally successful within one or two subsequent rotations.

In yet another aspect, a system of the invention includes a central database connected to a plurality of kiosks. All transactions such as "rent" and "returned data" at each kiosk are downloaded to the central database server. Preferably, each kiosk maintains a backup memory of certain information from the central database server, so that transactions may occur even in the event of communication failure between the kiosk and database server. By way of example, each kiosk may contain 12G-bytes of memory to store the certain information from the database server.

In still another aspect, the invention provides an automated customer profiling system. The system tracks interactions from customers at either a connected kiosk or at a computer connected to the database server through the Internet. Customers may be profiled according to individual information, such as movie-type preferences. Such a system may further send and accept "e-coupons" so as to discount certain rental offerings at one or more local kiosks. By way of example, the system may send an email to a customer to offer a discount rental for a DVD optical media at a near-by kiosk; that customer may accept the discount by interaction with the central database server through the Internet, or he may print the coupon and enter the coupon code at the near-by kiosk. E-coupons may thus incorporate promotion codes as individual numbers that are entered at the kiosk for discounts; accordingly, in one aspect, a kiosk of the invention includes a keyboard graphically represented at the kiosk touch screen. In one preferred aspect of the invention, discount magnetic stripe cards (i.e. grocery store club cards) are used for promotional discounts. In another preferred aspect of the invention, e-coupons used at a kiosk within the system of the invention may be tracked to assess advertising effectiveness.

Users of kiosks of the invention are preferably characterized by unique credit card numbers. Information that is attached to a user profile generated at a kiosk includes e-mail address and transactional data. Additional information can be initiated through the Internet or added to a pre-existing account, including phone number, address, and/or membership data In another aspect, a system of the invention provides real time inventory of connected kiosks. A user of the system can access the Internet and review the DVDs available at any of the connected kiosks. Inventory statistics are also prepared, preferably; such statistics are useful for example to flag those movies often rented and those that are not, so that multiple versions of highly rented movie may be made available to users.

In one aspect, a kiosk of the invention includes a vertical carousel housing 102 DVDs; the volume footprint of the carousel housing is approximately 24"×25"×15". A kiosk with such a carousel may be mounted in four different ways: on a pedestal, on a wall, on a counter-top, or in a wall. In the latter case, a "quick mount" frame is used to house the kiosk for mounting within a wall, in another aspect. A kiosk of the invention preferably is "plug and play", requiring only a phone line and a power cord, to begin operations. By way of example, a user of the kiosk purchases or rents the kiosk for use at his store; he mounts the kiosk on a store wall, plugs the kiosk to 110V power, and connects the kiosk to a phone line, which in turn connects internal kiosk intelligence to the central database server.

In another aspect, the mechanical design of a kiosk of the invention preferably utilizes a camshaft to time the door, the door lock, and the pinch rollers.

In another aspect, the kiosk is cooled by sinking heat to the housing to dissipate internally generated heat, thus eliminating external fans and other means of housing penetration.

In still another aspect, mechanical elements of the kiosk are preferably extruded and welded to other components in an efficient process flow.

In one aspect, a kiosk of the invention utilizes a card reader and associated software to read and conduct transactions with magnetic stripe cards such as credit cards, debit cards, club cards, or smart cards. In a preferred aspect, the card reader performs age verifications, to ensure rentals are made to appropriate age groups; as such, one card reader of the invention also provides for reading driver licenses or other identification.

One preferred kiosk of the invention includes an advertising module. Advertising information, such as trailers and advertisements, are downloaded from the central database server and stored on a local drive. Advertising information may be "customized" to any kiosk location according to typical user preferences and, for example, specific demographics. The advertising information may further include video advertisements played at the kiosk for display to users thereby. Play-lists may thus be customized for each location, and locally selected, but administered centrally through connection between the kiosk and the central server. Simplified administration screens connecting administrators to the central server facilitate control and selections at a connected kiosk.

Advertisements used in kiosks of the invention may be digital still images or motion video in MPEG2 format, or other suitable formats. Advertising files are inventoried on the core server and then downloaded on request to the requested kiosks. This file is then stored locally at the kiosk (e.g., within kiosk memory) and may be inserted into the advertising play list in as many slots as needed. The list plays continually in a looped format during requested hours. Play lists may be shown on an LCD display on the face of the kiosk and/or on additional external monitors.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF PREFERRED EMBODIMENTS

Figure 1:
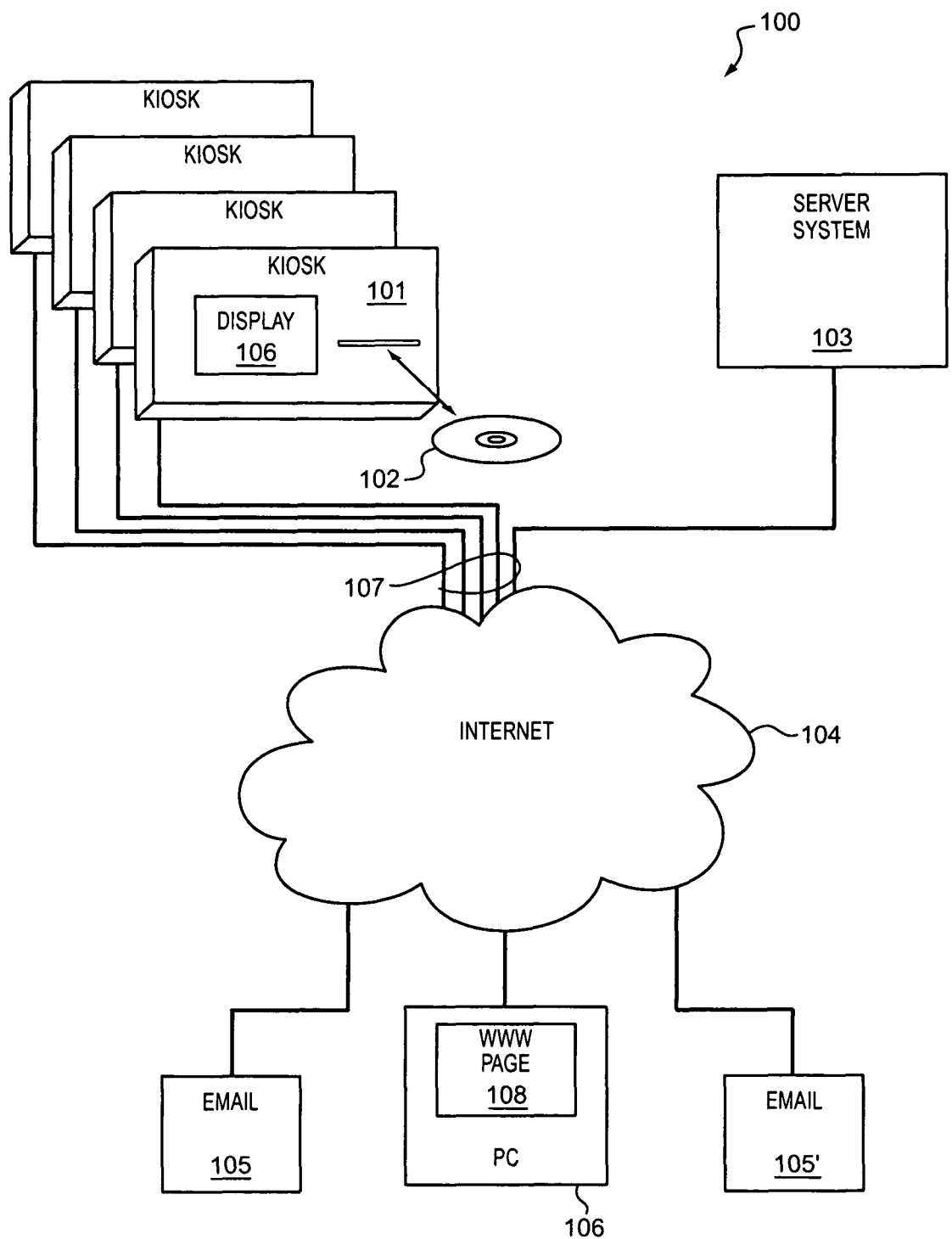
FIG. 1 illustrates the recorded media distribution system of the invention.

In the following detailed description of the present invention, a method and system are provided for Internet-based and automated recorded media distribution and retrieval; specific details are set forth in order to provide a thorough understanding of the present invention. It will be obvious, however, to a person skilled in the art that the present invention may be practiced without these specific details, and changes may be made to the description herein without departing from the scope of the invention.

The integrated recorded media distribution system is centered on combining instant physical access to recorded media with the convenience of Internet based e-commerce. The system is particularly adapted to support Digital Versatile Disk (DVD) recorded media, and other optically recorded disks.

In the preferred embodiment, an Internet-connected central server integrates customers, suppliers, employees, kiosks, owners, and the video industry in a "Hub and Spoke" system that is preferably automated and interactive, providing real time business-to-consumer and business-to-business capabilities.

The system kiosks are part of the Hub and Spoke network system. The kiosks act as brick and mortar spokes, providing a faster, more convenient way for customers to obtain and return DVD videos or other optical recorded media. Each kiosk is a self-service unit that combines electro-mechanical dispensing devices and components, Internet connectivity and a touch screen monitor for customer interaction. The compact nature of the DVD format allows up to 102 disks to be stocked in a kiosk, like the kiosk shown in FIG. 8. The kiosk's small space requirement allows placement in high-traffic locations that are more convenient than traditional retail locations. Internet connectivity allows customers to have the choice of shopping online or on-site or to access a variety of real-time services.

Each kiosk is a self-service unit that includes an internal processor, Internet connectivity, and a touch screen monitor for customer interaction. The small physical footprint of the kiosk enables it to be placed in a variety of locations. The kiosks can operate 24 hours a day, 7 days a week, providing instant electronic access to products. The kiosks are fully automated providing customer service through the Internet; on-site staffing is not required to support customer needs. The system web site provides 24-hour access to on-line customer support. It also provides access to specific kiosk inventory, movie trailers and reviews, customer inquiries, special orders, regular individually tailored e-mailed updates, and overall service. The integrated remote kiosk monitoring system allows low cost inventory management, tailored marketing promotions, operations planning, advertising management, and system diagnosis.

In the preferred embodiment, the kiosks are physically designed to meet American Disabilities Act (ADA) specifications so that they may be placed in public facilities. The kiosks also preferably meet other regulatory requirements of public transportation facilities, universities, and office buildings.

The system central server supports a World Wide Web site. The central server includes promotional drivers and accessory services that route through the system website in conjunction with the kiosks. Customers may use the Internet to query a specific kiosk for availability, or to purchase new and used optical recorded media, register for e-mailed updates, or participate in various targeted programs.

The integrated system allows fast transactions. A simple and easy to use title search process minimizes shopping time and allows rapid transactions. Transaction times from walk-up to walk-away can be less than 40 seconds and average 2.5 minutes. Return of media is also simple, as the disks only need to be re-inserted into the dispensing/retrieval mechanism. Upon the return of a disk at a kiosk, the internal computer reads individual identification information from the disk and restocks it automatically.

The system allows remote price changes and can also gather up-to-the minute product availability and customer data. Thin-client computing technology keeps hardware costs low and speeds up application deployment by centralizing management, and enhancing security. E-mailed receipts generated from the kiosks through the central server allow ongoing access to customers after the completion of the transaction.

Recorded disk pricing may be determined on a kiosk-by-kiosk basis based on local market conditions. Pricing also varies depending on market elasticity; for example, premiums may be placed on DVD videos available in airport terminals. Differentiated pricing can be used for newer releases vs. older releases. In addition, rental terms and promotions may vary based on kiosk locations and the time of week, and can be adjusted remotely on demand.

Figure 8:
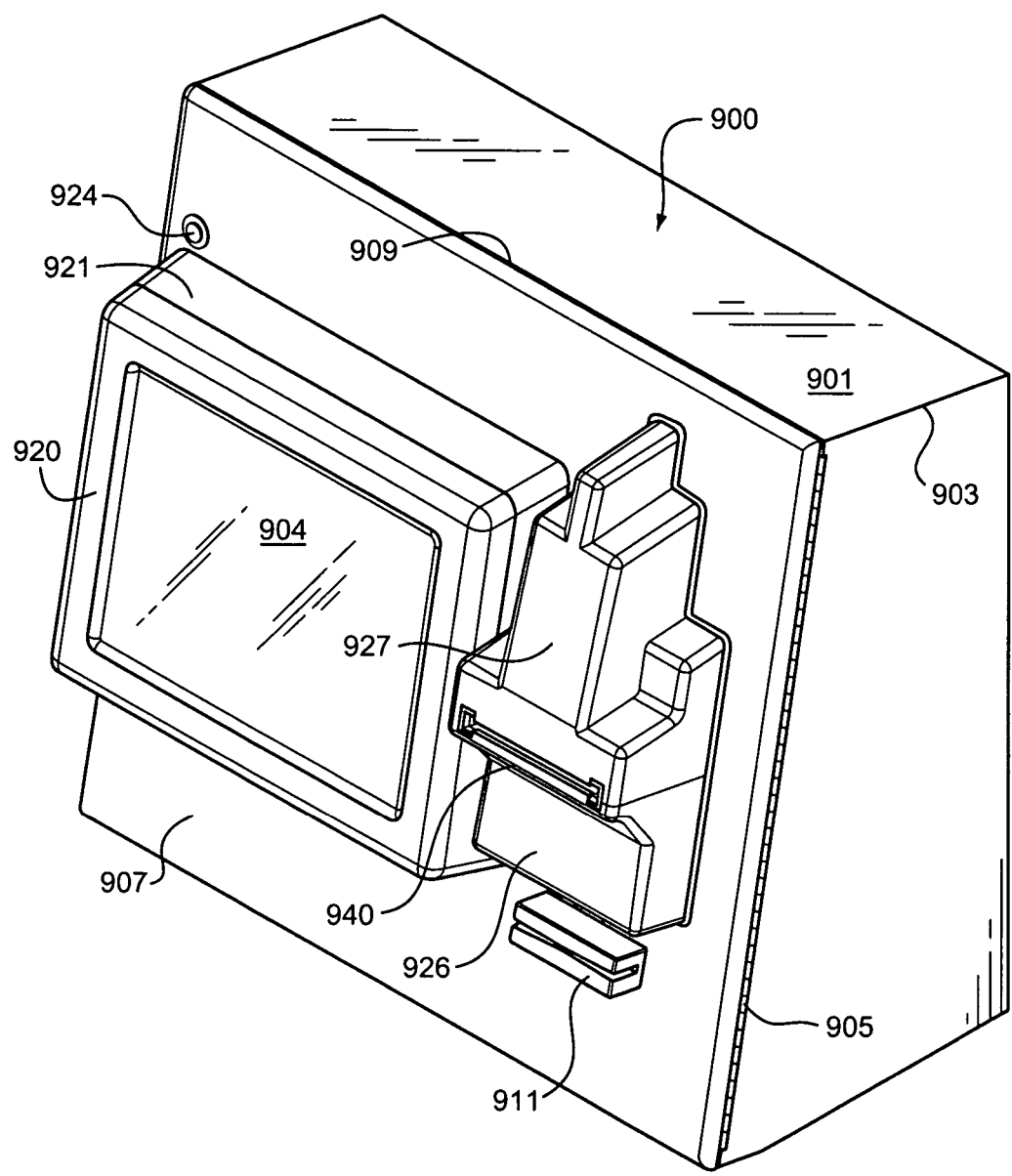
FIG. 8 is an exemplary perspective view of a preferred embodiment of a kiosk, in accord with the invention.

At a kiosk such as shown in FIG. 8, a graphical user interface (GUI) utilizing a touch screen display provides a user-friendly interface even to consumers lacking computer experience. Once a touch screen is activated, a computer in the kiosk generates a touch-selectable list of available media: movie genres such as Action, Drama, Romance, and Comedy, for example. By touching on one of the genres, a selection of associated titles and/or a promotional picture may appear on the screen. Touching an image causes basic information to be displayed about that media such as cost and rating, along with an option to rent or purchase the media. When selection of media is complete, a credit, debit card, and/or other membership ID is requested to execute the transaction and then the disk is dispensed to a customer.

Return of rental media is similar; a customer may select "Rental Return" button on a touch screen, and then insert a disk into an opening in the kiosk. An optical scanner first verifies that the disk belongs to the system before accepting a disk.

Internet connectivity and a dynamic customer database provide product promotion capabilities and consumer access. Product information and promotions may be tailored to each location's demographics and additionally to each kiosk's rental and sell-through history. Advertising is available on the kiosk, kiosk screen, additional associated monitors, disk cases, dispensed coupons, e-coupons, e-mailed receipts, and through various web-based interactions. Advertising with the kiosk system provides mechanisms to promote specific marketing initiatives as well as additional local and global advertising. The system website allows consumers to search for kiosks and to query a specific kiosk for available content. The website also carries updated lists of used media for sale at discounted prices at individual kiosks. A customer may reserve and pay for a DVD stocked at a specific kiosk from the website, then pick up the DVD within a specified time period at the specific kiosk. Once a customer enters e-mail information at the kiosk or at the website, that customer is eligible to receive frequent tailored e-mailed updates and e-coupons from the central server on current promotions.

Additional products potentially distributed through the kiosks include a variety of recorded media such as books on optical recorded disks, DVD music videos, DVD-ROM, DVD video games, DVD-Audio, SA-CDs and CDs. The modularity of the system allows for easy adoption of additional disk-based content distribution.

Some portions of the following detailed description are presented in terms of procedures, logic blocks, processing steps, computer program code and other symbolic representations of data operations within a computer memory. A procedure, logic block, process, etc., is a self-consistent sequence of steps or instructions leading to a desired result. The steps are those requiring physical manipulations of physical quantities.

A practitioner will recognize that all of these and similar terms are to be associated with the appropriate physical quantities and are merely convenient labels applied to these quantities. Unless specifically stated, terms such as "processing," "computing," "calculating," "determining," "displaying," refer to the action and processes of a computer system or similar electronic computing device.

Figure 6:
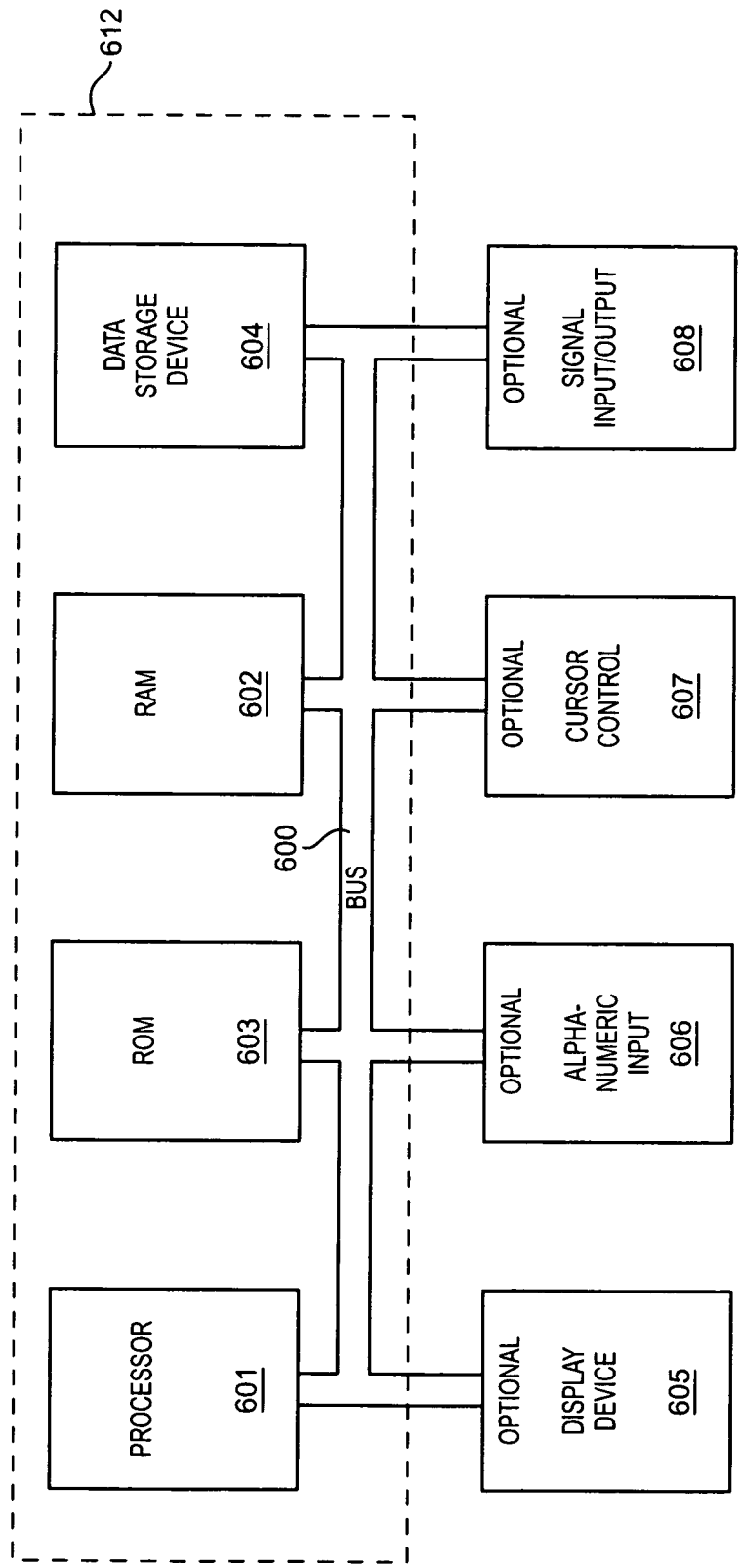
FIG. 6 is a block diagram of an exemplary computer system of the invention, suitable for use with a kiosk or system central server database.

FIG. 6 illustrates a computer system 612 suitable for use in the kiosk of FIG. 8, or in central server 103, FIG. 1. In general, computer system 612 used by the preferred embodiment of the present invention comprises a bus system 600 for communicating information between system components. A central processing unit 601 for processing information and instructions is coupled to bus system 600. A processing unit may be a processor, a microprocessor or any group or combination of processors or microprocessors. A random-access memory 602 for storing information and instructions for the central processor 601 is coupled to bus system 600. A read-only memory 603 for storing static information and instructions for the processor 601 is coupled to bus system 600. A data storage device 604, such as a magnetic or other disk drive, for storing information and instructions is coupled to bus system 600. A display device 605 for displaying information to the kiosk user is coupled to bus system 600. An alphanumeric input device 606, including alphanumeric and function keys (e.g., a touch screen), for communicating information and command selections to the central processor 601, may be coupled to bus system 600. A cursor control device 607 for communicating user input information and command selections to the central processor 601 may be coupled to bus system 600. A signal-generating device 608 for communicating data or signals between devices external to system 612 and processor 601 may be coupled to bus system 600.

FIG. 1 illustrates a preferred embodiment of an optical disk distribution system 100. Generally, system 100 distributes recorded optical media in disk form; for example a Digital Versatile Disk (DVD), or a Compact Disc (CD). A disk, recorded disk, DVD, CD, or recorded optical media are used interchangeably herein to refer to an optical recorded media. System 100 integrates one or more kiosks 101 with a server system 103 through a virtual network 107 that uses the Internet 104. Server system 103 is connected to the Internet 104 also for direct linking to individual email accounts 105 and 105'. Server 103 supports a World Wide Web page set 108 for general access by customers using the Internet 104. Generally, access to system web page set 108 supported by server 103 is through an Internet Service Provider (ISP) that provides an Internet connection for a personal computer 106. Kiosk 101 has a display 106 for viewing and entering information. Kiosk 101 dispenses and receives disks 102, via an opening in its front.

Figure 2:
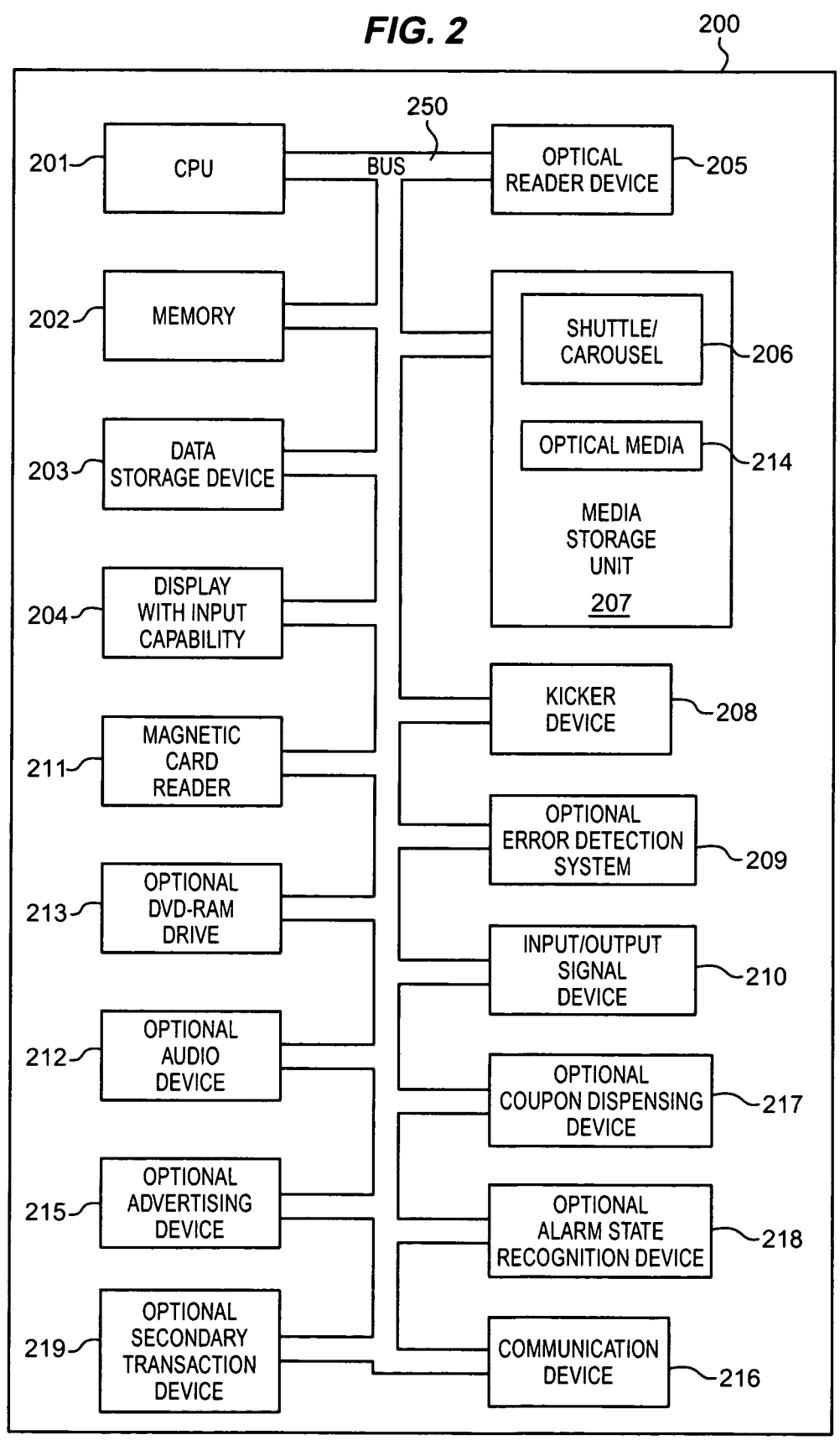
FIG. 2 is a block diagram of a system kiosk, in accord with the invention.

FIG. 2 illustrates a schematic embodiment of a kiosk 200 (e.g., kiosk 101, FIG. 1). Kiosk 200 is a self-contained unit dispensing system that contains computer devices and mechanical devices. A central processing unit 201 is operably connected to a system bus 250. System bus 250 may be a single bus or a series of busses for communicating data or signals between various devices and central processing unit 201. A memory device 202 for storing instructions and/or other information is operably connected to system bus 250. A data storage device 203 for storing data, or containing databases and/or other instructions, is connected to system bus 250. A display device 204 having alphanumeric input capability is operably connected to system bus 250. A magnetic card reader 211 for reading magnetically imprinted cards is operably connected to system bus 250. Any device suitable for uniquely identifying a customer such as a smart-card, license reader, fingerprint scanner/identifier, or other identification device may be substituted for, or augmented to, magnetic card reader 211 when appropriate. An optical reader 205 for reading bar codes is operably connected to system bus 250. Reader 205 may include a digital camera to view optical media and an associated housing, to facilitate access control of media to the kiosk. A disk shuttle assembly 206 for accessing and storing disk media is operably connected to system bus 250. A media storage unit 207 for storing optical media 214 is contained in kiosk 200. Shuttle assembly 206 may be contained in, or integrated with, media storage unit 207 for accessing optical media 214. A kicker device 208 for dispensing or receiving optical disk media 214 is operably connected to system bus 250. A communications device 216 such as a modem or network connection is operably connected to system bus 250. An optional audio device 212 for providing kiosk sound capability may be connected to system bus 250. An optional DVD-Ram or DVD-ROM drive 213 for reading data from, or writing data to, optical media may be operably connected to system bus 250. An optional coupon-dispensing device 217 may be operably connected to system bus 250. An optional alarm state recognition device or algorithm 218 may be connected to system bus 250. An optional secondary transaction device 219 for processing custom banking processes such as local debit card transactions may be connected to system bus 250.

An optional error detection system 209 for detecting damaged optical disc media may be internal to or external to kiosk 200. When error detection system 209 is internal to system kiosk 200, error detection system 209 is operably connected to system bus 250, and DVD-RAM or DVD-ROM drive 213 is operably connected to system bus 250. Other output/input signal devices 210 may be connected to kiosk 200, as needed. By way of example, one input device 210 includes a digital camera for capturing images of persons and/or objects near to kiosk. Such a camera is useful, for example, in capturing the user while he or she inputs identification or credit card information; later the information may be compared to the input data in the case of fraud. By connecting camera device 210 to bus 250, images captured thereby may be downloaded to the central server, as needed, in this process.

An optional advertising device 215 for broadcasting advertising and promotional materials to additional monitors may be internal or external to kiosk 200; when advertising device is internal to kiosk 200, advertising device may be operably connected to system bus 250, as shown.

Those skilled in the art should appreciate that kiosk 200 may alternatively function with computer system 612 as at least part of internal schematic items 201, 202, 203, 204.

Each kiosk 200 preferably has a database stored in memory 203 of its kiosk inventory; and this inventory is preferably duplicated at the core server 103, FIG. 1. Memory 203 also preferably stores a set of kiosk parameters specific to a kiosk. This set is fed from the core server 103 and includes any local language translations, logos, color schemes, advertisements or video graphics, and the advertising play list. All transactional data passes through to core server 103 and is preferably not stored, long term, in local memory 203.

Kiosk 200 interacts with a central server preferably as shown in FIG. 1. Central server 103 preferably polls each individual kiosk 103 (e.g., kiosk 200) for status information, every five or ten minutes, for example. If the information from kiosk 200 is not normal, then one or more alarm states are generated to administrators of the central server. Alarm states may be generated for any of a variety of reasons, for example indicating: that kiosk 200 is not on; an incorrect inventory; security breaches; incorrect readings by any internal device or sensors; and combinations thereof. This feature is very powerful to assist in management of the array of kiosks. Alarm state messages may be relayed to a core server administrator by email, pager messages, cell phones and the like, and in near real time to indicate a problem at any of the connected kiosks 101.

Figure 3:
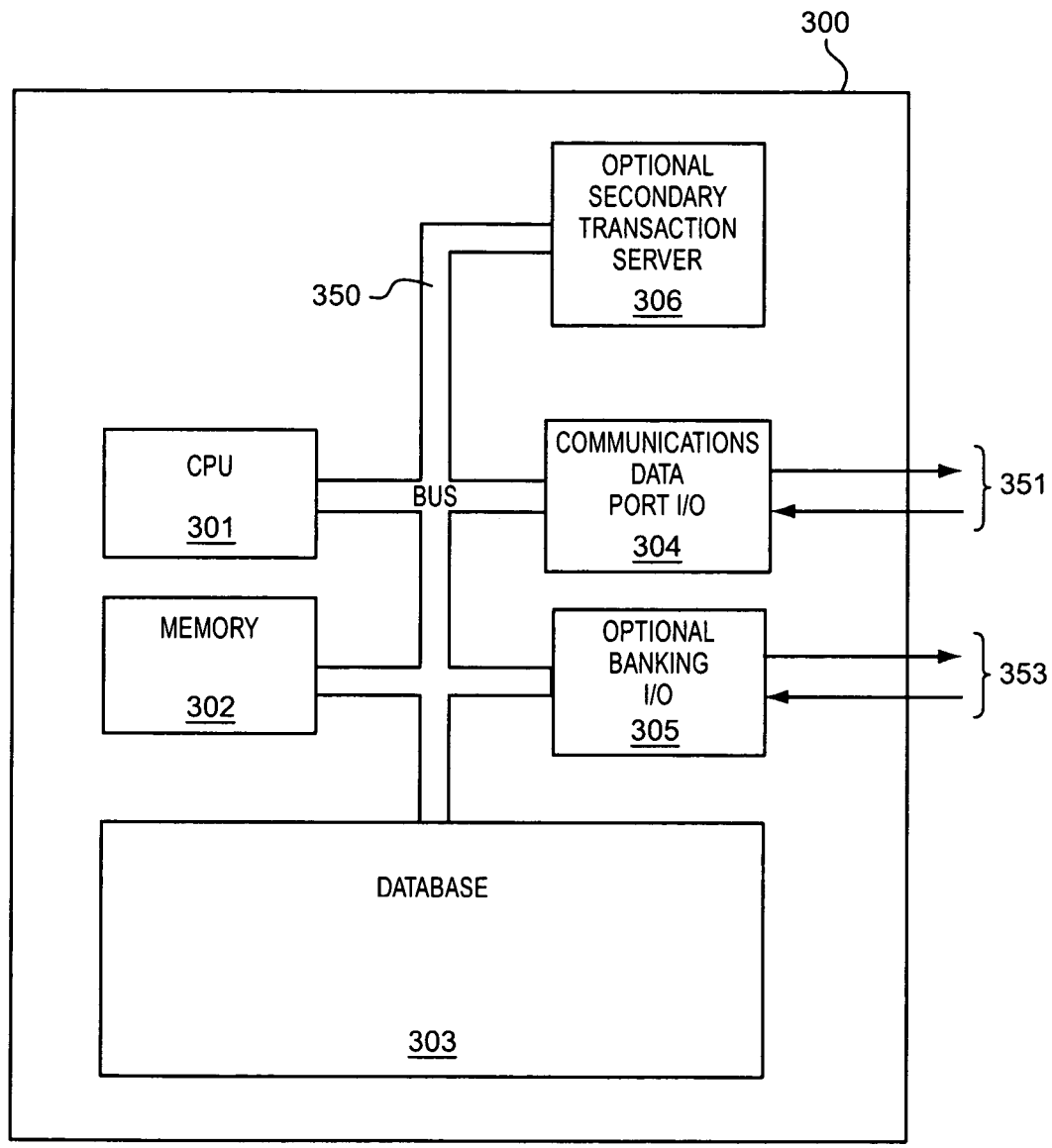
FIG. 3 illustrates a system central server, in accord with the invention.

FIG. 3 is an illustration of a preferred embodiment of a central server computer 300. The system central server computer 300 may also be computer system 612. System server 300 provides command and control and collects and delivers data to and from kiosk 200. Server computer 300 has a central processing unit 301 that is operably connected to server system bus 350. A memory device capable of storing instructions 302 is operably connected to server system bus 350. A database 303 for storing data is operably connected to system bus 350. A communication device 351 capable of transmitting and receiving data or html 304 is operably connected to system server bus 350. An optional second communication device 353 for exchanging data for commercial transactions 305 may be operably connected to server system bus 350. An optional secondary transaction server device 306 for processing secondary transactional data such as grocery store club card data may be operably connected to server system bus 350; server device 306 may alternatively be a connection to facilitate connection to a remote server to accomplish like function.

Figure 4:
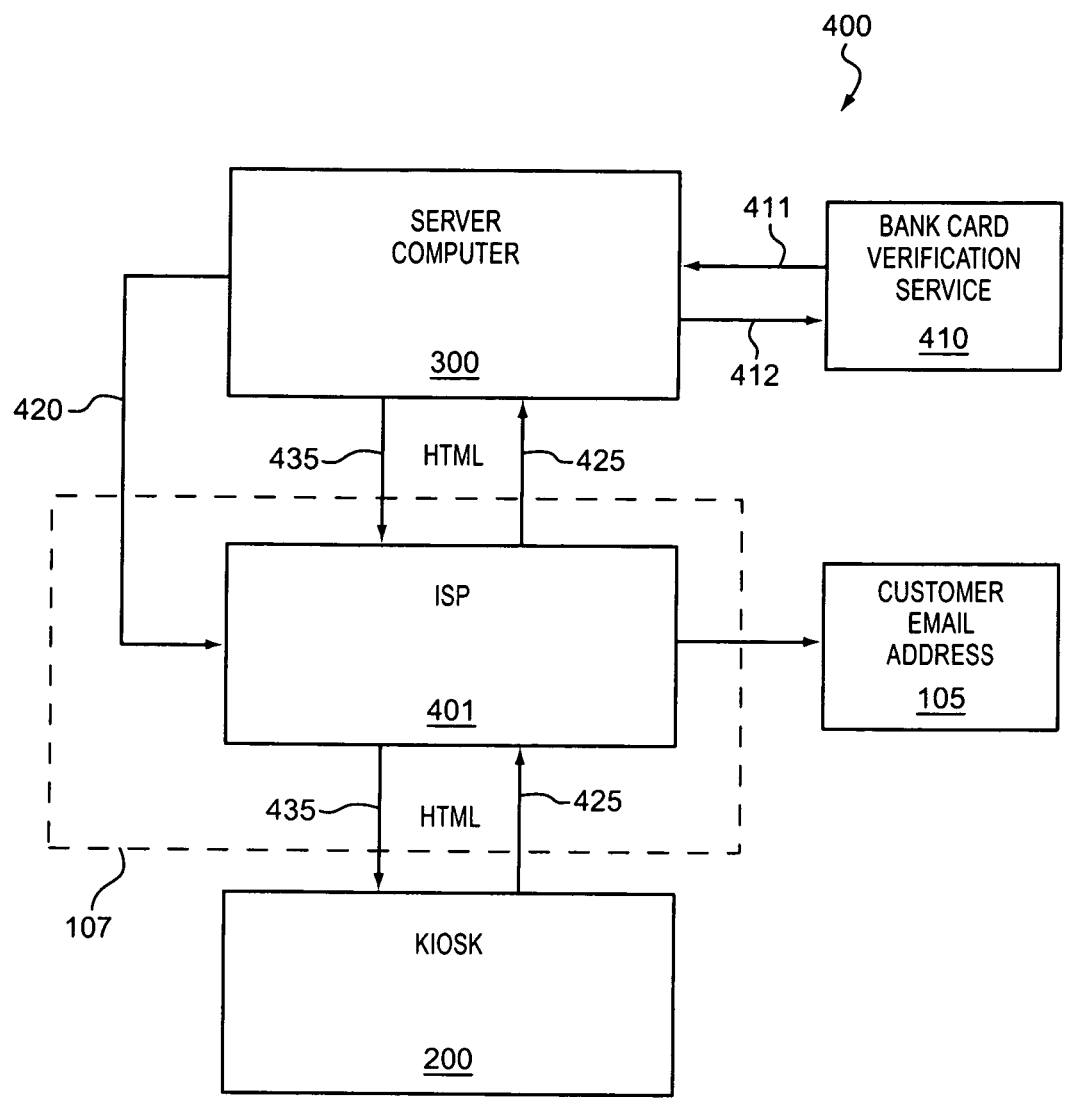
FIG. 4 is a block diagram data exchange within the distribution system, according to the invention.

FIG. 4 depicts a preferred embodiment of the system data transfer mechanism 400. Mechanism 400 for example facilitates item 107 of FIG. 1. A virtual network connection 107 provides data exchange between kiosk 200, FIG. 2, and server computer 300, FIG. 3. The kiosk-server virtual network system 107 can be a local network system or a remote network system that may utilize an html-based data exchange, e.g. an intranet or extranet. The exchange of data in html format includes an html request 425 and an html page 435; alternative communications between server computer 300 and ISP 401 may occur through signal line 420. Both kiosk 200 and server computer 300 may request and receive data using the html protocol, allowing a two-way data-exchange system. The use of the html protocol allows an Internet browser to be a system interface, and additionally allows system 100, FIG. 1, to be administered by an Application Service Provider (ASP) using the Internet. An ASP provides software applications across the Internet by basing resident software on central server 103 that is accessed using an Internet browser. The use of ASP's is desirable where the functionality of a network is desired, but the use of a private server-system is impossible or impractical. An Internet Service Provider (ISP) 401 may also be an ASP. ISP 401 provides a connection to the Internet to individual computer users.

Exchange of data using virtual network 107, FIG. 1, is accomplished in a secure manner using methods of data encryption and decryption known in the art. Secure transfer of data through ISP 401 provides a virtual private network connection. An additional data exchange may occur on a dedicated private network connection for banking services, or alternatively using a virtual network as in item 107. Server computer 300 may obtain credit or debit or other membership authorization using information received from a customer. A credit authorization request 412 is transmitted from server 300 to a bankcard verification service 410, which generally is a secure server computer. After receiving credit authorization request 412, bankcard verification service 410 processes credit authorization request 412, and transmits a response 411 to server computer 300. Response 411 is conveyed to kiosk 200, FIG. 2, through virtual network 107, FIG. 1.

Figure 5:
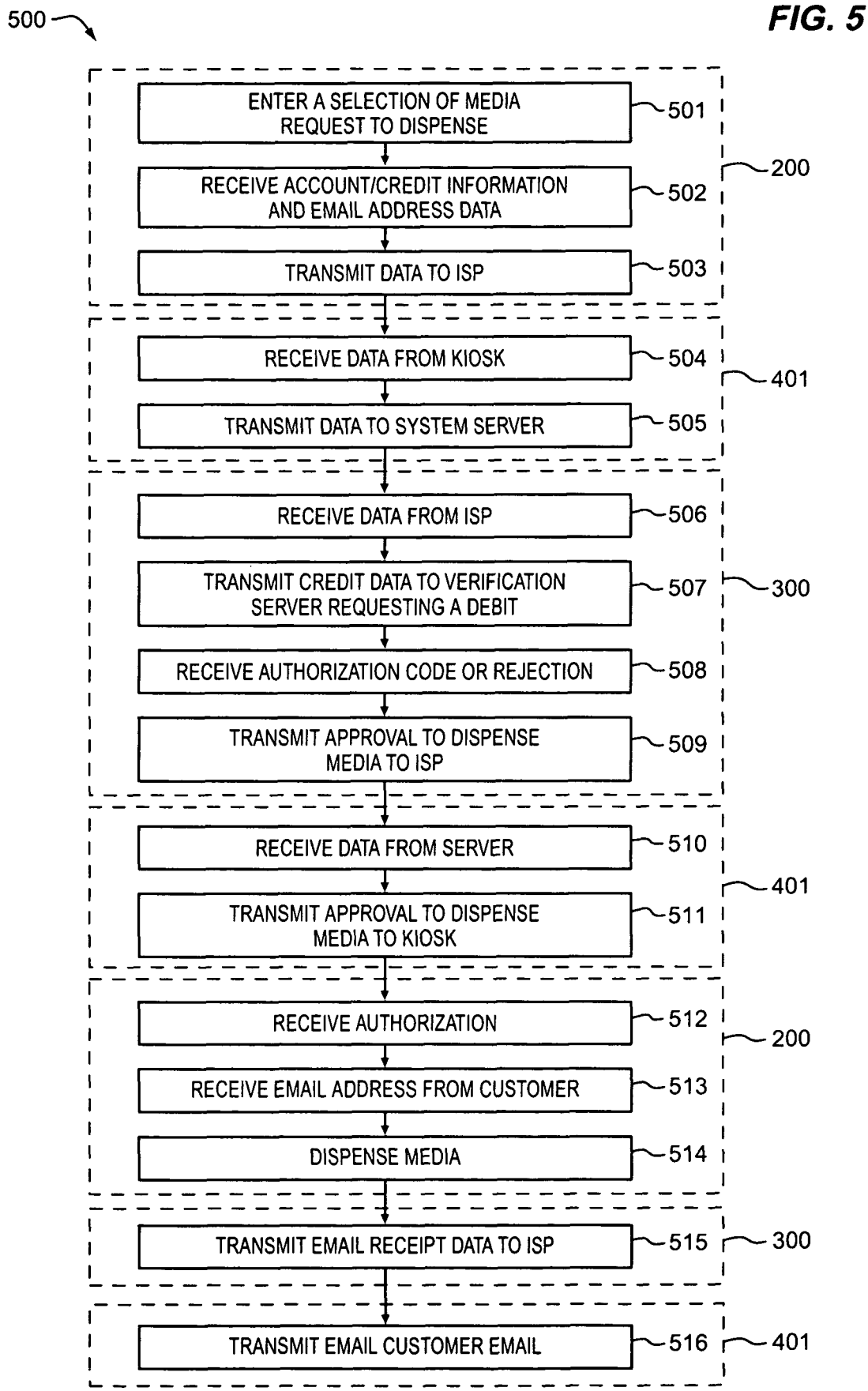
FIG. 5 is a flowchart of a system transaction, in accord with the invention.

FIG. 5 illustrates a preferred embodiment of a disk-dispensing transaction process 500, in accord with the invention. Process 500 begins with a request to dispense a media selection from kiosk 200, FIG. 2, in step 501. Information including, for example, credit-card number, and/or license or identification information, is next received from a customer to kiosk 200, in step 502. Kiosk 200 then securely transmits data received in step 502 to ISP 401, FIG. 4, in step 503. Data securely transmitted in step 503 is received to ISP 401 in step 504. Data received to ISP 401 in step 504 is securely transmitted to system server 300, FIG. 3, in step 505. Data securely transmitted to system server 300 in step 505 is next received at system server 300 in step 506. System server 300 next securely transmits debit and/or credit authorization request data to a credit verification server in step 507. System server 300 next securely receives credit authorization data from a credit verification service in step 508. System server 300 next securely transmits authorization data received in step 508 to ISP 401 in step 509. In step 510, data transmitted by system server 300 in step 509 is received by ISP 401. In step 511, ISP 401 securely transmits to kiosk 200 authorization to dispense requested media received from system server 300 in step 510. In step 512, kiosk 200 securely receives authorization to dispense media transmitted from ISP 401. Optionally, in step 513, an email address is securely received for customer. In step 514, kiosk 200 dispenses requested media to a customer. In step 515, system server 300 transmits to ISP 401 an e-mail receipt for a debit transaction occurring in steps 507 and 508 for an e-mail address supplied in step 513. In step 516, ISP 401 transmits email receipt data received from system server 300 in step 515 to an email address received in step 513.

Figure 7:
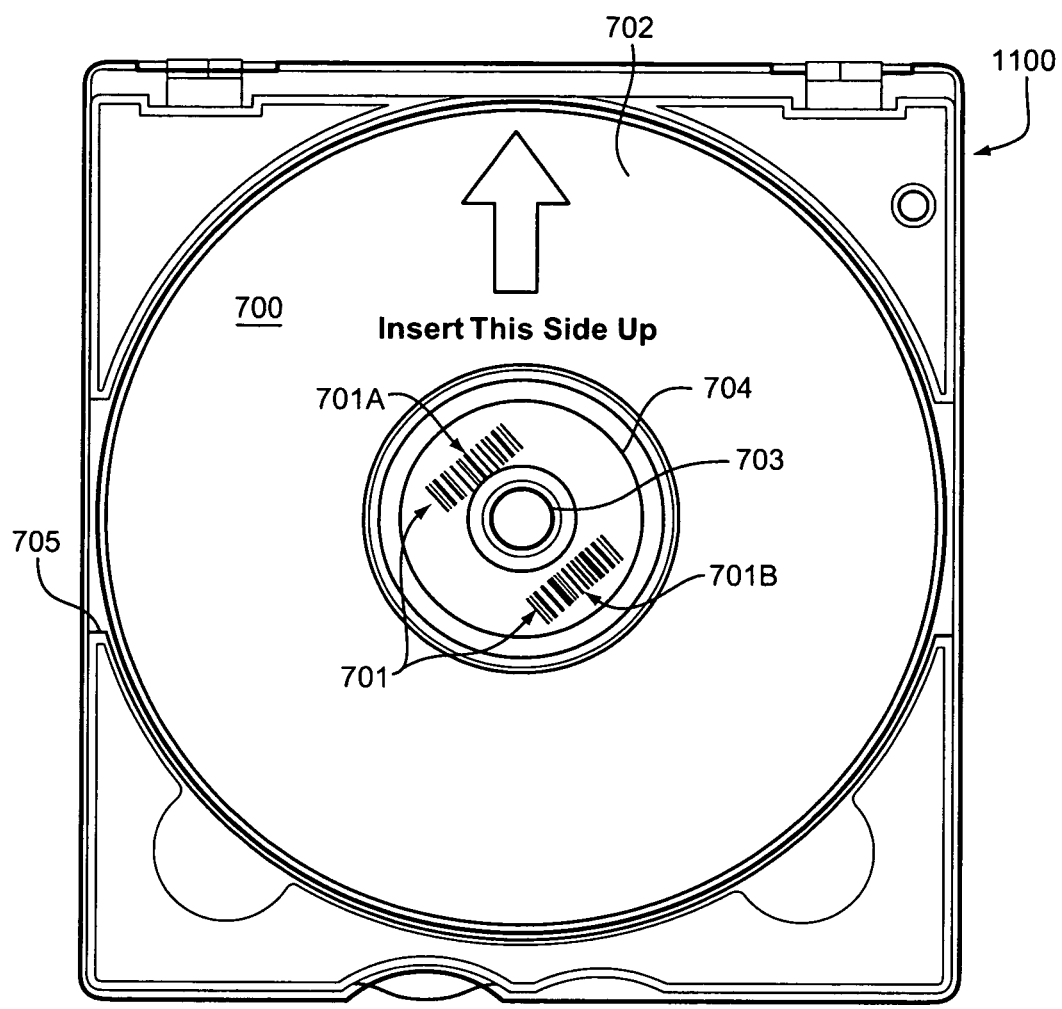
FIG. 7 is a depiction of a bar code and optical disk used in accord with the invention.

In a preferred embodiment of the invention, shown in FIG. 7, an optical bar code 701 uniquely identifies each recorded disk 700, A region on the case between the media outside diameter 705, and the center region 704 may be used for a label region 702. A center region 704 exists between the label region 702 and the center hole 703. The center region 704 may contain printed information (e.g., a bar code) on both single-sided and double-sided optical media. For recorded disk 700, barcode 701 is read by capturing a digital picture of barcode 701, and then internal software to kiosk 200 rotates an image of barcode 701 to perform one or more "pseudo" scans of barcode 701.

FIG. 8 is an exemplary perspective-view embodiment of a kiosk 200, FIG. 2. A kiosk housing 900 forms an enclosure. The outer dimensions of housing 900 may be about 25" tall, 25" wide, and 15" deep. A computer, e.g., computer 612, FIG. 6, or CPU 201, FIG. 2, is included inside housing 900. A touch screen display 904 is positioned on the front of housing 900. Display 904 may show advertising play list images and movie trailers in addition to providing user interface functions described herein. An input/output slot 940 is positioned on the front of housing 900 to dispense and receive optical recorded media disks. A magnetic strip reader 911 is positioned on the front of housing 900. A transfer mechanism/controller is included in housing 900 to manipulate disks into and out of housing 900. This transfer mechanism may be shuttle/carousel 206, FIG. 2, or the structures illustrated in FIGS. 9-18

In the preferred embodiment, touch screen display 904 has an LCD backed up by a metal plate to protect internal components should the LCD break. Around display 904 is a cast bezel 920, providing protection for the customer and the display 904. The display LCD may be sealed to bezel 920 to protect it from fluids and moisture. Bezel 920 is angled at the top 921 to discourage people from placing objects on it.

Access to inside of housing 900 is through a cam lock 924. Access within housing 900 facilitates mounting or dismounting of housing 900 to walls or other surfaces; internal access is also used to access power and communications connections. The key for cam lock 924 cannot be removed in the unlocked position.

Magnetic strip reader 911 is used by kiosk 200, FIG. 2, to identify a customer or member, and/or to bill the customer, and/or to verify age. Reader 911 is thus preferably usable with magnetic strips used in driver's licenses, credit cards, membership cards, student body cards, etc.

All cases and optical media inventory normally enter and exit thru Input/output slot 940. Housing 900 and slot 940 thus cooperate to protect media inventory; specifically, inventory cannot be removed from housing 900 (e.g., by stealing) without breaking the housing and optical media. Authorized access can only occur through use of cam lock 924 and special tools used to disassemble the carousel from the spindle (described in more detail below). Slot 940 is also constructed to prevent a person from inserting a finger into internal working mechanisms.

Cast covers 926 and 927 protect input/output mechanisms of slot 940, and further shields the bar code scanner/camera (described in more detail below) housed internally to housing 900. Cast covers 926 and 927 may only be removed from the inside with tools.

Housing 900 includes a sheet metal enclosure 901 with welded seams 903 to protect internal components from moisture, dirt and vandalism. Sheet metal enclosure 901 is shaped to provide a 5-degree back-angle tilt to the faceplate 907. This angle assists in viewing LCD 904 as well as providing a gravitational vector that assists the seating of disks in carousel 950. Enclosure 901 has a flat bottom to allow for counter-top installation, and a sloped top to discourage customers from placing objects on the kiosk. Kiosk 200, FIG. 2, runs without an external cooling fan and mounts easily on a wall, thru a wall, on a countertop, or on a pedestal. Enclosure 901 serves as a "heat sink" to radiate heat from heat-generating inner components, such as a computer 612, and drive motors (described in more detail below). Housing 900 also has a full-length side piano hinge 905 to protect the kiosk from vandalism and contamination. A cast main faceplate 907 serves as the front of housing 900 and provides a mechanically stable platform for the working elements of kiosk 200; it also serves to deter penetration by vandals. The remaining seam 909 between faceplate 907 and enclosure 901 is baffled and gasketed to protect against penetration by mechanical means or by dust or liquids.

Figure 9:
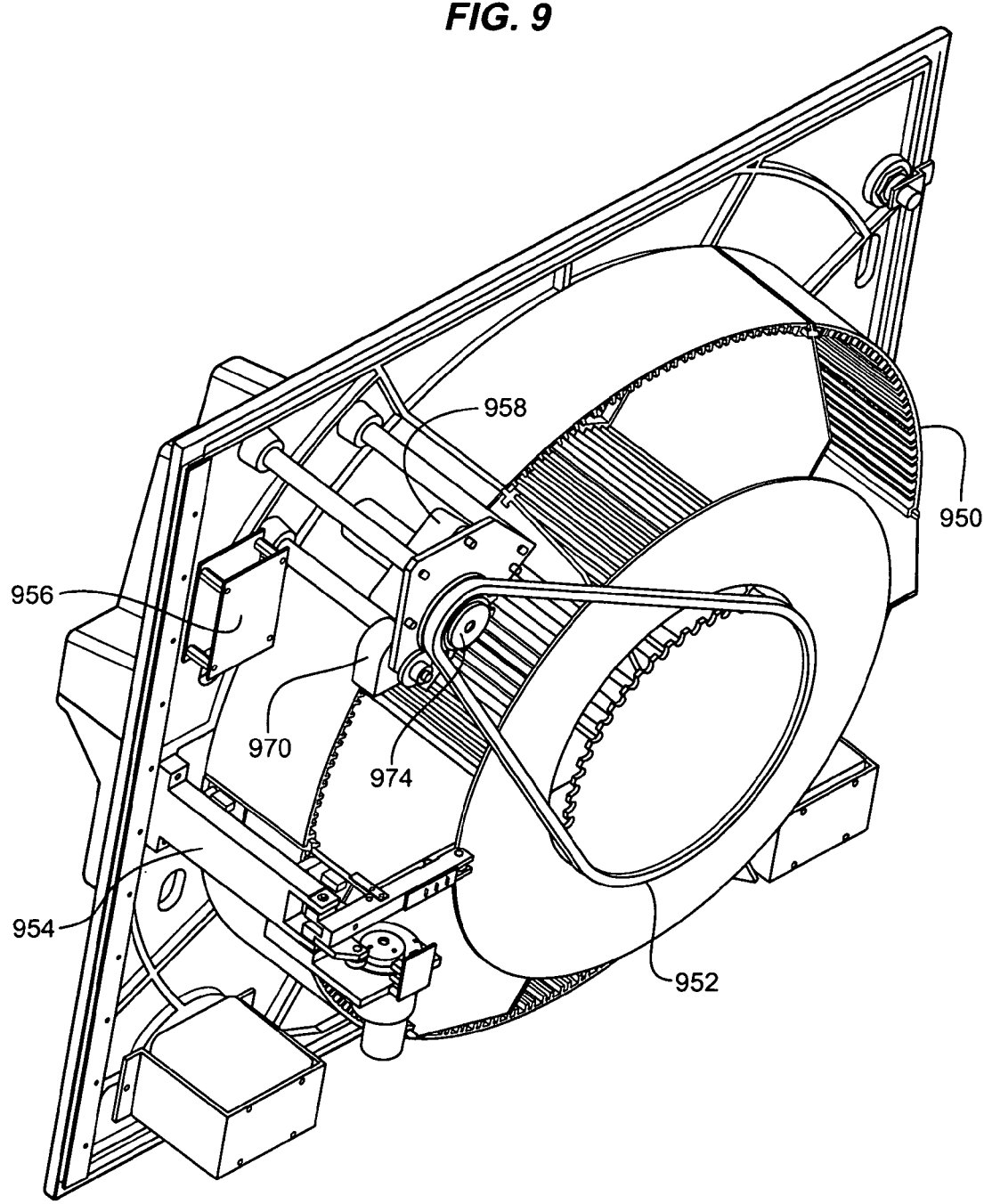
FIG. 9 shows a perspective view of internal mechanics, including a carousel, for a kiosk of the invention.

FIG. 9 shows a perspective view of electro-mechanical elements that are internal to housing 900. A carousel 950 that rotates to dispense optical disks holds 102 cases; carousel 950 is lightweight and easy to fabricate using interlocking aluminum extrusion. The extrusions after assembly are jigged and welded to minimize run-out and to assure stability. Carousel 950 is preferably driven by chain drive 952 to ensure "no-slip" operation. An eject mechanism 954 dispenses optical recorded media from housing 900, through input/output slot 940; mechanism 954 connects to faceplate 907 by two mechanical screws. One cable (not shown) serves to power and control mechanism 954, via the internal computer and connected power. A servo-controller and RS232-485 converter 956 drives the carousel motor 958. Carousel drive motor 958 may, for example, mount within housing 900 by three mechanical screws; two cables generally connect to motor 958 to provide power and electrical control.

Figure 10:
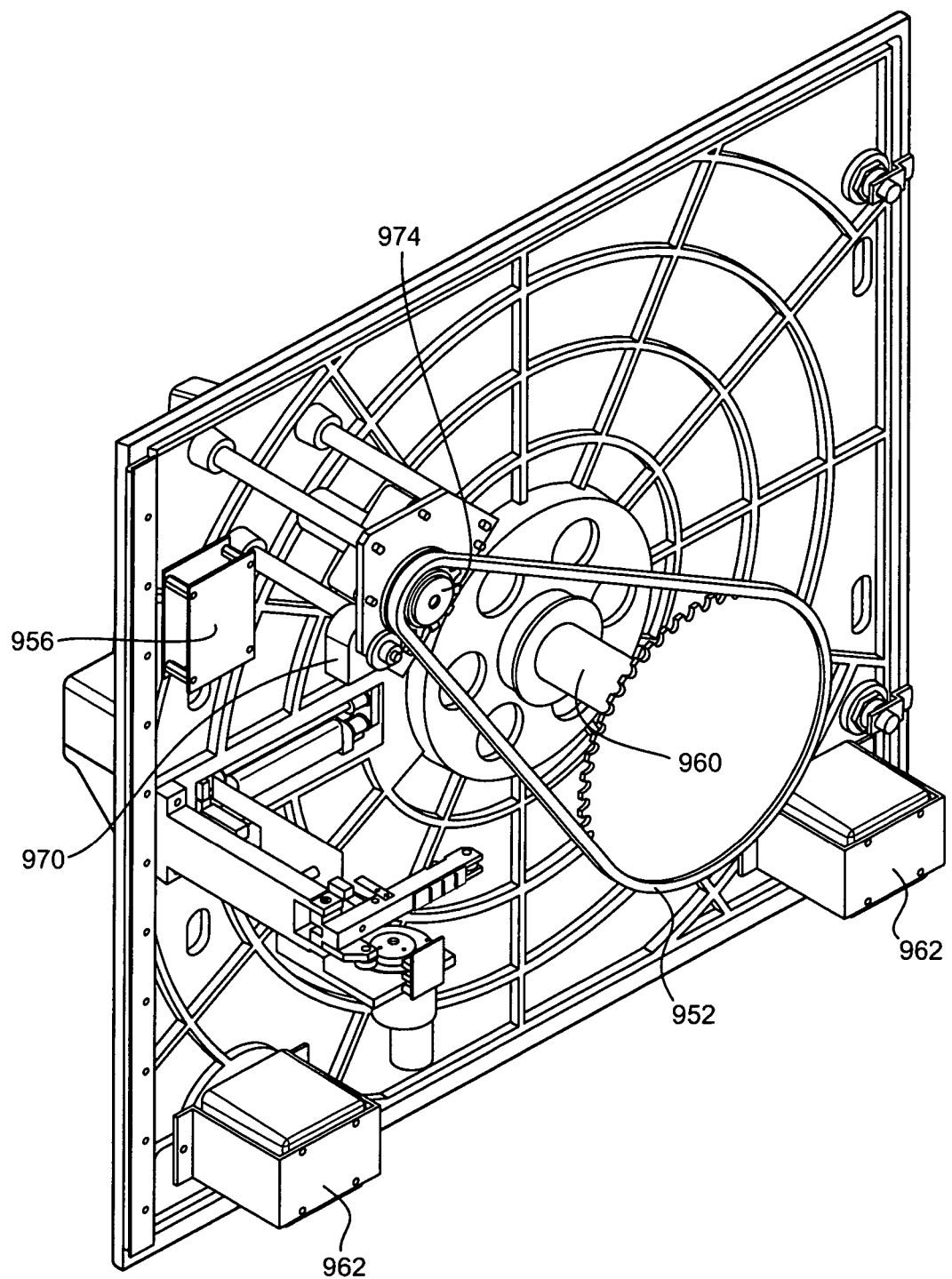
FIG. 10 shows a perspective view of spindle mechanics for the carousel of FIG. 9, and further illustrates placement of speakers for a kiosk of the invention.
Figure 11:
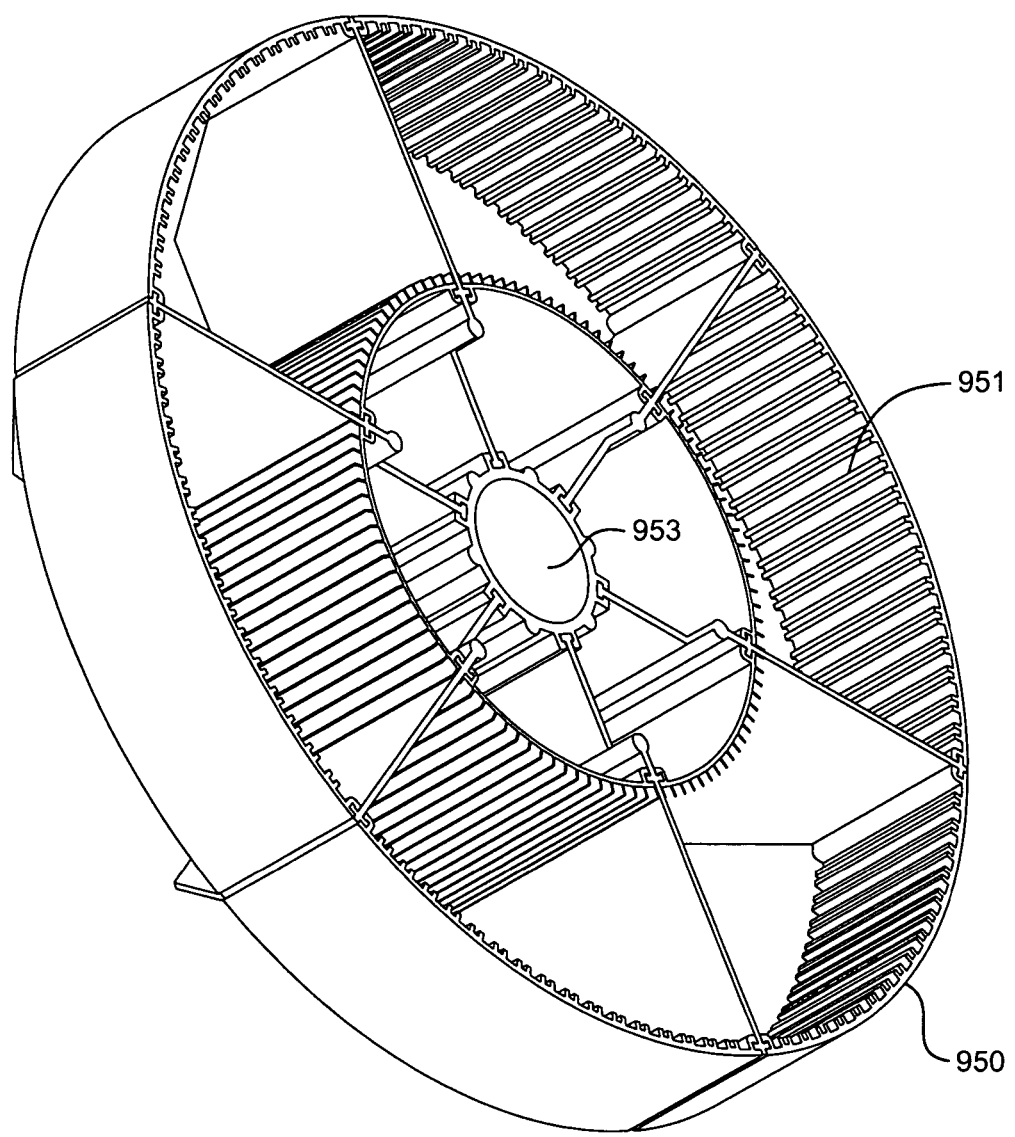
FIG. 11 shows a perspective view of a carousel of the invention.

FIG. 10 shows further detail of internal mechanics of kiosk 200, FIG. 2, within enclosure 900, FIG. 8. A spindle assembly 960 holds carousel 950 for rotation thereon. FIG. 11 shows a perspective view of carousel 950 alone. Each slot 951 of carousel 950 holds one optical media disk within a case, described in more detail below. Carousel 950 has a central hub 953 for mounting on spindle assembly 960. Carousel 950 is removed from spindle assembly 960 by three mechanical screws (not shown). FIG. 10 also shows a more detailed view of speakers 962, providing audible tones, music and communications to users of kiosk 200. Speakers 962 for example may be audio device 212 of kiosk 200, FIG. 2.

Figure 12:
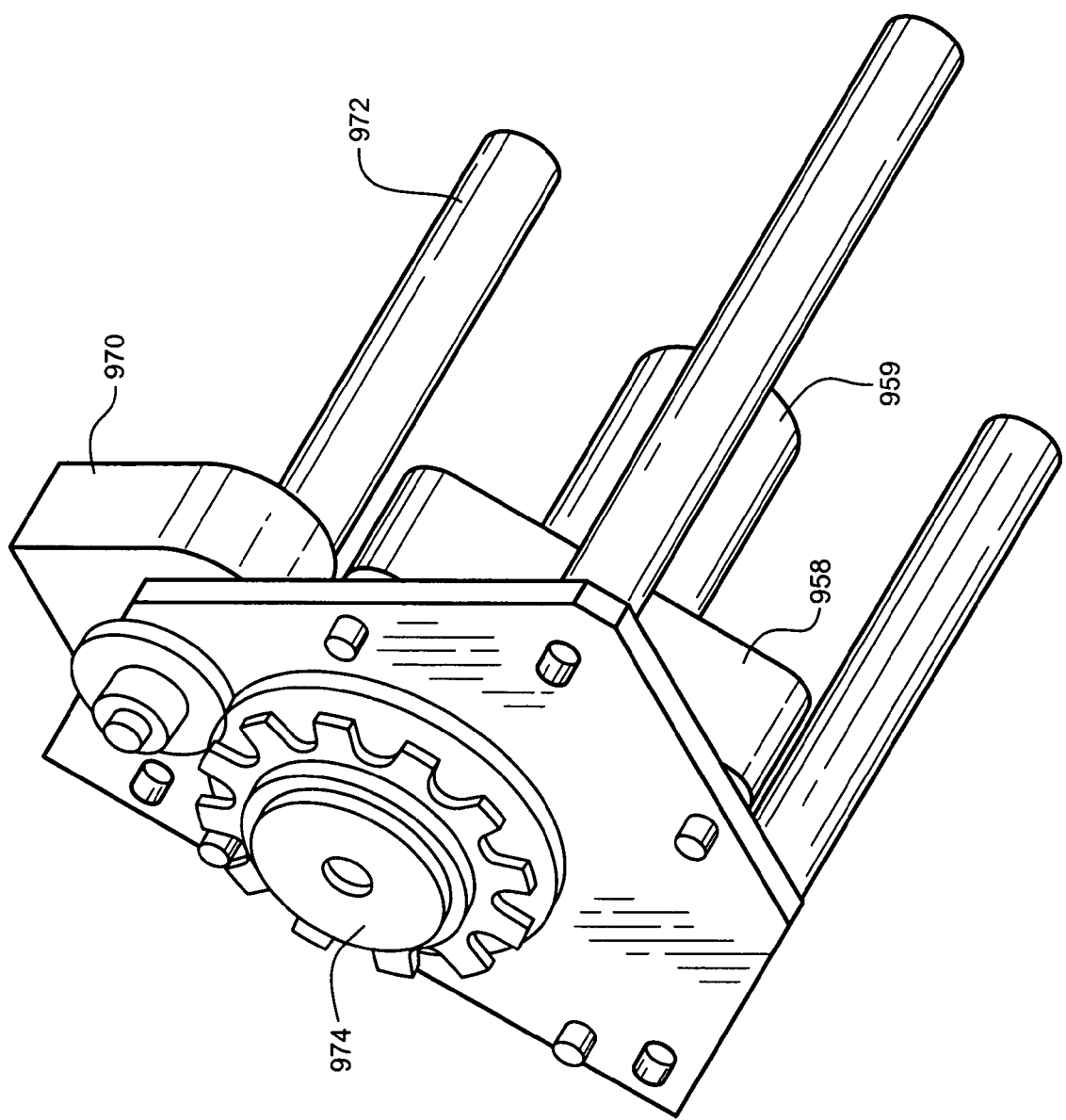
FIG. 12 shows an encoder and motor for use in a kiosk of the invention.

FIG. 12 shows an encoder 970 that is used by kiosk 200 to accurately position carousel and spindle 950, 960. The standoffs 972 act as supports and as preload springs for drive chain 952. A sprocket 974 drives chain 952 and, thereby, carousel 950. Gear motor 958 provides the torque and speed to accurately position carousel 950.

Figure 13:
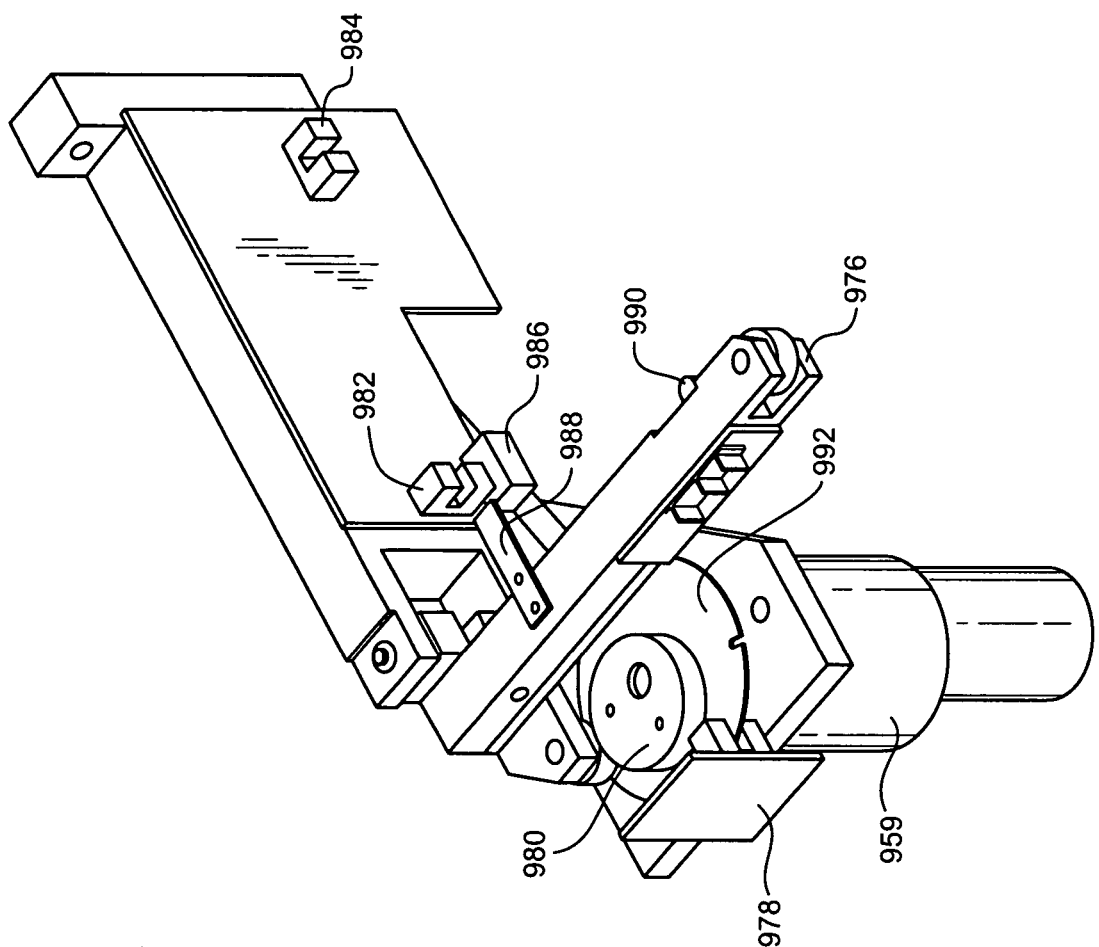
FIG. 13 shows other internal drive shaft and electro-mechanical components within a kiosk of the invention.

FIG. 13 shows further detail of mechanical components within housing 900. The gear motor 959 rotates cam 980 to move eject arm 976 in and at a controlled speed and position. Optical sensors 978 provide feedback with motor 959 to accurately position eject arm 976 in the "Out" position (i.e., clear for carousel rotate) and in the "In" position (i.e., arm 976 is in position for kiosk 200 to sense an incoming case). A flag 992 trips optical sensors 978 above. An optical sensor 982 provides additional feedback indicating that an eject maneuver is in fully ejected position; a flag 988 trips optical sensor 982 in performing this function. An optical sensor 984 picks up a flag on carousel 950 as a home reference for carousel position. The offset value is adjusted in operating software. A reflective optical sensor 986 senses the presence of a case in a slot 951, FIG. 11. A mechanical switch 990 senses a case during a return to a slot 951. Eject arm 976 supports mechanical case switch 990 and pushes a case into the input/output rollers (described below) during an eject cycle.

Figure 14:
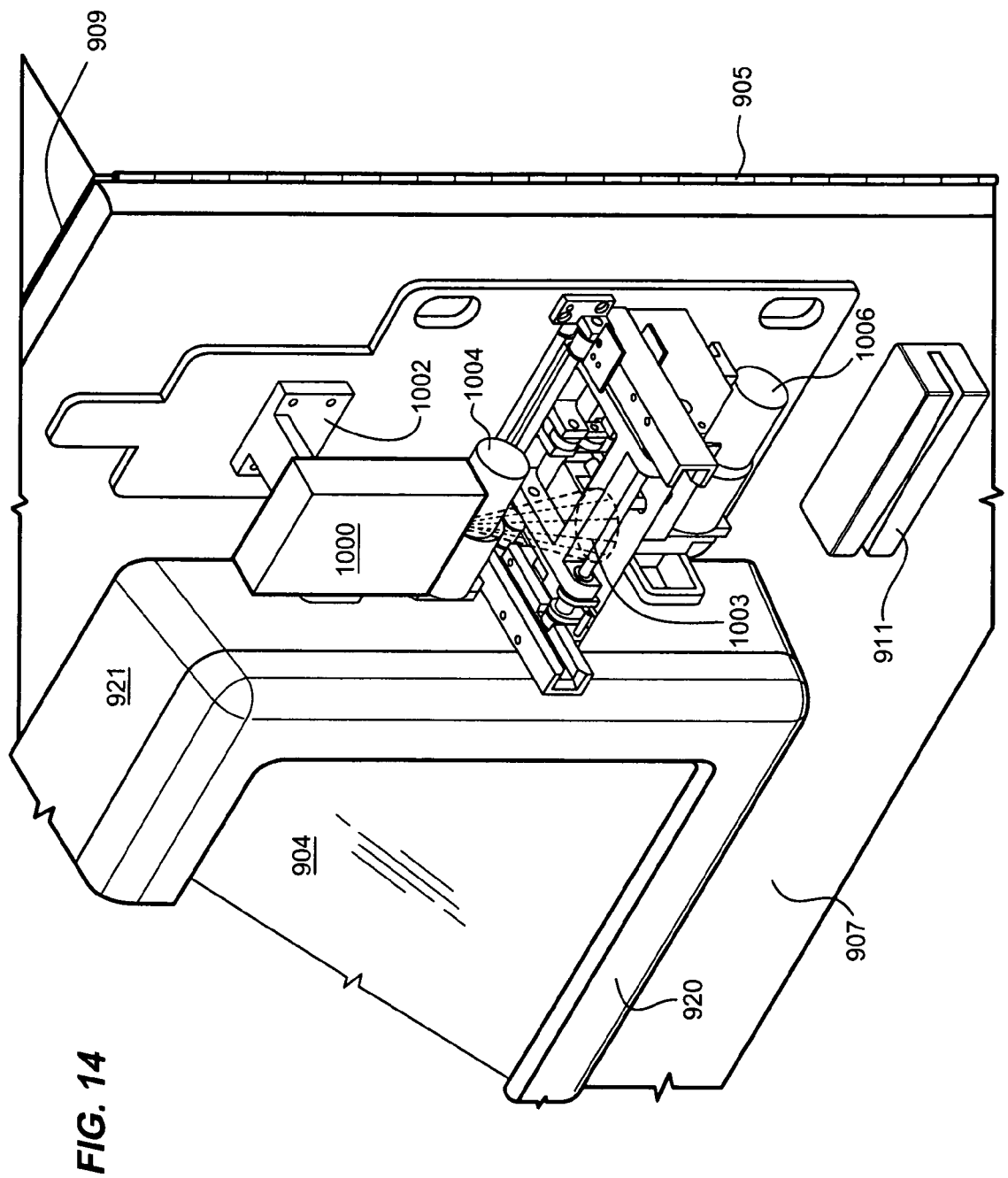
FIG. 14 illustrates opto- and electro-mechanical components of a kiosk using digital cameras and input/output mechanics for optical recorded media, in accord with the invention.

FIG. 14 shows additional features of a kiosk of the invention, including internal electro-optical and electro-mechanical components to facilitate the operations herein. FIG. 14 specifically shows these components used in conjunction with the input/output slot 940, FIG. 8. A digital camera 1000 couples to a mount 1002, as shown. One suitable camera for camera 1000 is a 3Com 00371800 HomeConnect PC Digital Camera. Camera 1000 captures an image approximately 1.6" in diameter, through its illustrative field of view 1003. This image is then processed by the internal kiosk computer (e.g., computer 612, FIG. 6) to assess barcodes, patterns and/or characters on a disk 700, FIG. 7. A special pattern may be placed on optical media label 702 and next to barcodes 701 to deter fraud. Barcodes 701 captured by camera 1000 as a digital image can be decoded at various angles. The image is stored locally or at the core server 103, FIG. 1, for post processing should an issue arise regarding a related transaction. Illumination for camera 1000 in capturing the digital image is through active illumination (e.g., a light). A gear motor 1004 provides the torque and speed to accurately position a case in or out of a slot 951. A gear motor 1006 provides the torque and speed to accurately drive a cam that operates the door, door lock and pinch rollers (discussed below).

Figure 15:
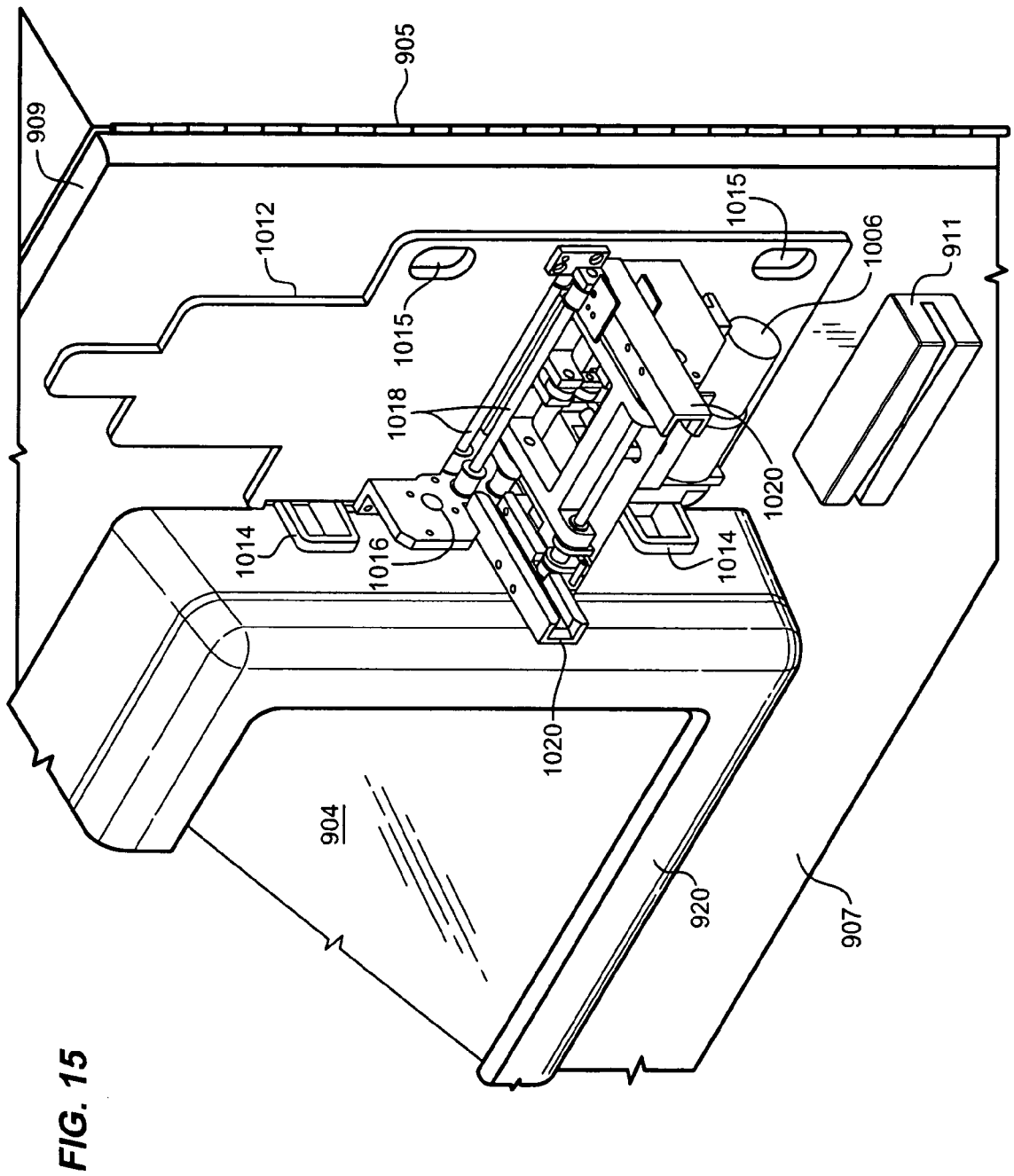
FIG. 15 shows further detail of the mechanics of FIG. 14.

FIG. 15 shows additional features of a kiosk of the invention, including internal electro-optical and electro-mechanical components to facilitate the operations herein. FIG. 15 specifically shows these components used in conjunction with the input/output slot 940, FIG. 8. A ridge 1012 provides relief for the post machining of cast main plate 907, and further provides a reference for gasketing and a shield against mechanical penetration. Cable routing apertures 1014 facilitate cable connections through bezel 920; cable routing apertures 1015 facilitate cable connections through main plate

907. Drive gears 1016 rotate the intake/output rollers 1018. A pair of case glides 1020 physically guides a case into and out of kiosk 200.

Figure 16:
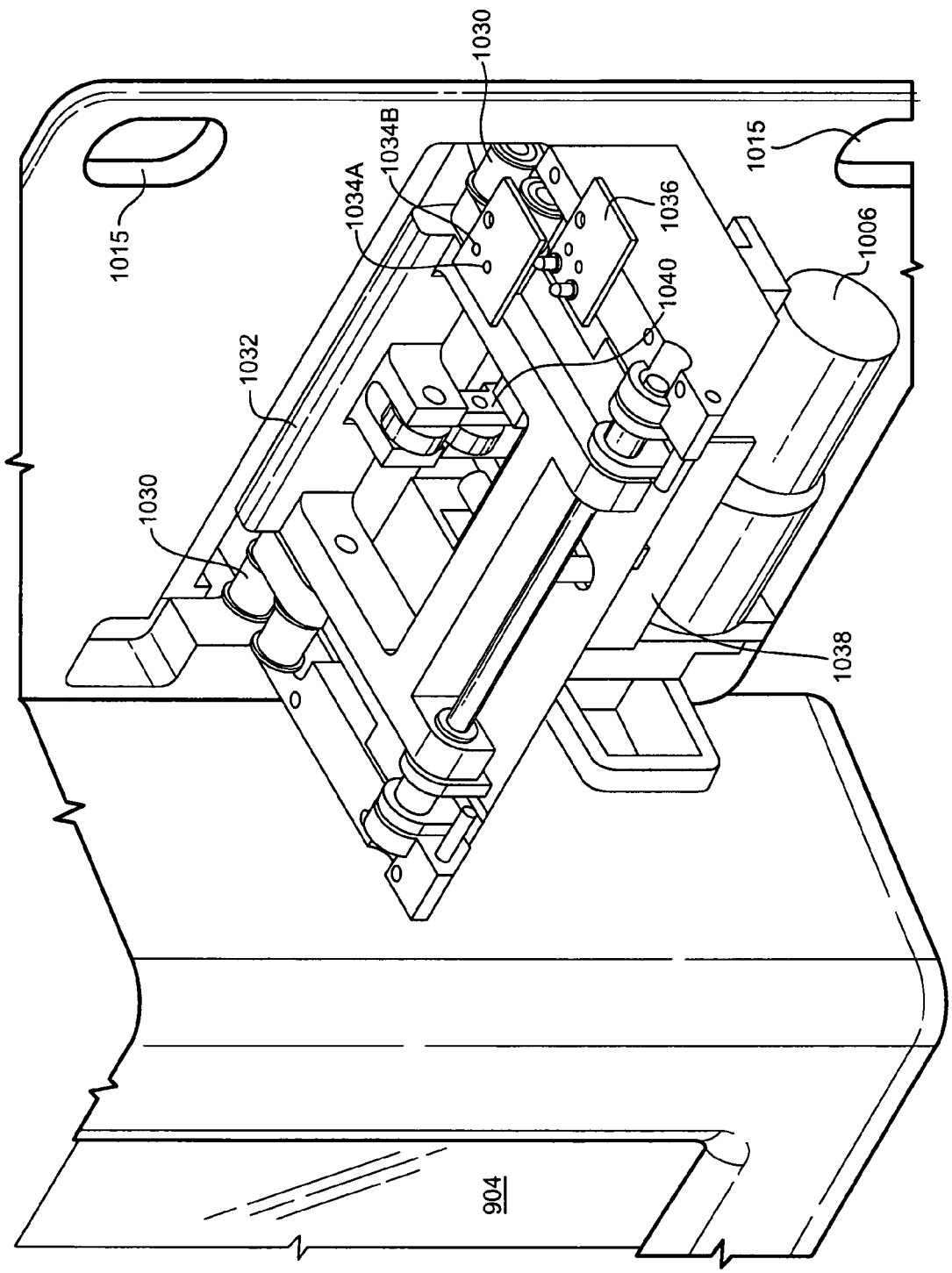
FIG. 16 shows further detail of the mechanics of FIG. 15.
Figure 17:
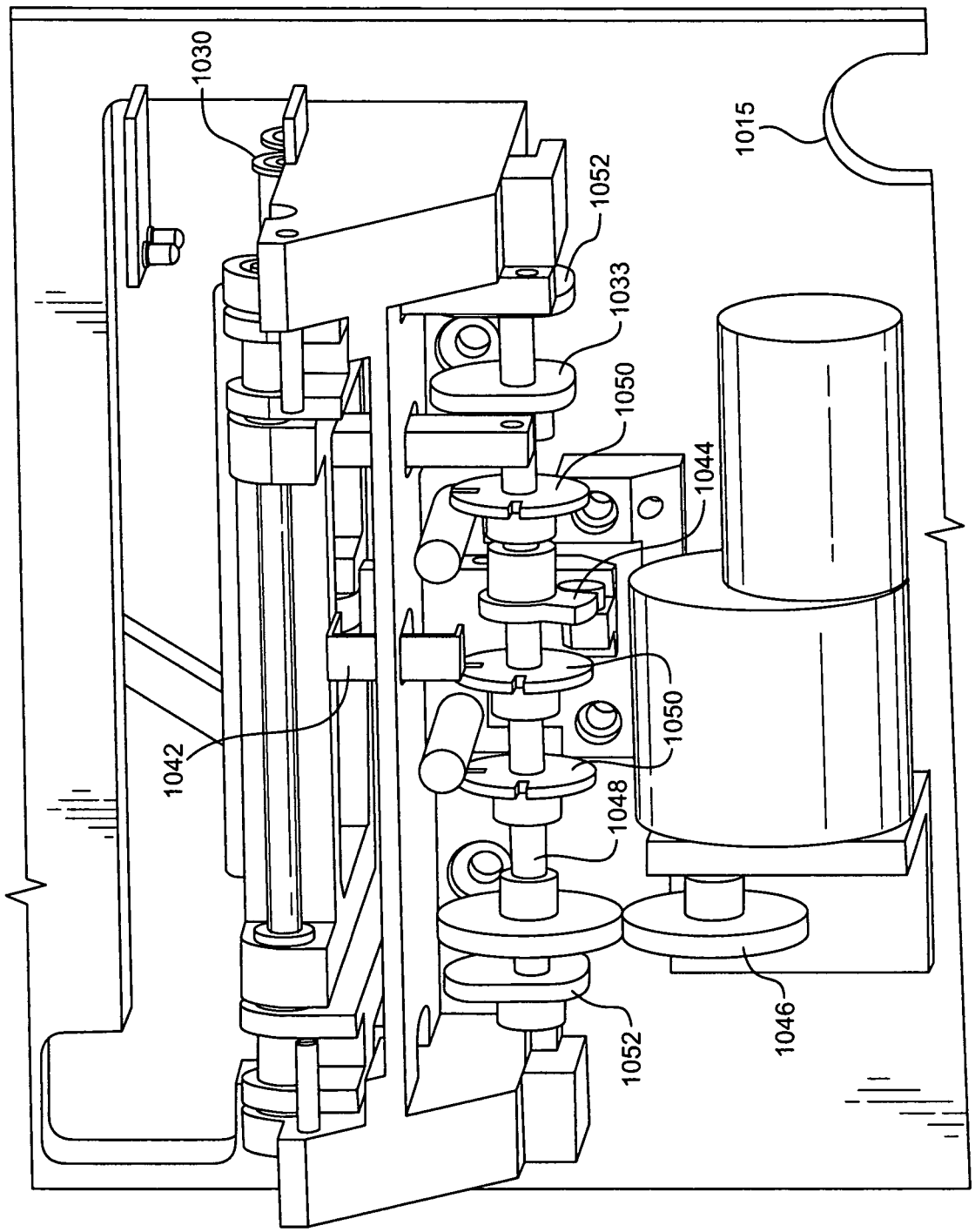
FIG. 17 shows camshaft operation detail within a kiosk of the invention.

FIG. 16 shows additional detail of the input and output mechanism of kiosk 200. The pinch rollers 1030 force a case through guides 1020 against the intake/output rollers 1018, FIG. 15, and also set the case during a return. A door 1032 prevents an unauthorized case or object from entering the kiosk and shields inventory when carousel 950 is rotating. The case sensors 1034 determine whether a case is valid to trigger an image read by camera 1000, FIG. 14. The activation sequence of sensors 1034 is used to determine if a case is removed prematurely during a return cycle or if a case is adequately ejected during an output cycle. The case sensor LEDs 1036 provide the operating light for case sensors 1034. Optical sensors 1038 provide the feedback required to position camshaft 1048 (FIG. 17). Sensor 1038 (a "door closed" sensor) may be used to show when door 1032 is fully closed so that carousel 950 can be safely rotated with a clear doorway. A door lock 1040 automatically latches and locks door 1032 as soon as a case clears the doorway during either an input or output cycle.

FIG. 17 shows additional features of a kiosk of the invention, including internal electro-optical and electro-mechanical components to facilitate the operations herein. FIG. 17 specifically shows these components used in conjunction with the input/output slot 940, FIG. 8. A flag 1042 trips "door closed" sensor. A door cam 1033 operates to open and close door 1032. A door lock cam 1044 operates the door lock 1040. A gear 1046 drives camshaft 1048 for cams 1033, 1044, and 1052. Three flags 1050 position cam shaft 1048 in following four distinct positions:

Door 1032 closed and lockable; pinch rollers 1030 open
Door 1032 open and unlocked; pinch rollers 1030 open
Door 1032 open; pinch rollers 1030 closed
Door 1032 closed and locked; pinch rollers 1030 closed Two pinch roller cams 1052 move pinch rollers 1030 to closed and open positions.

Figure 18:
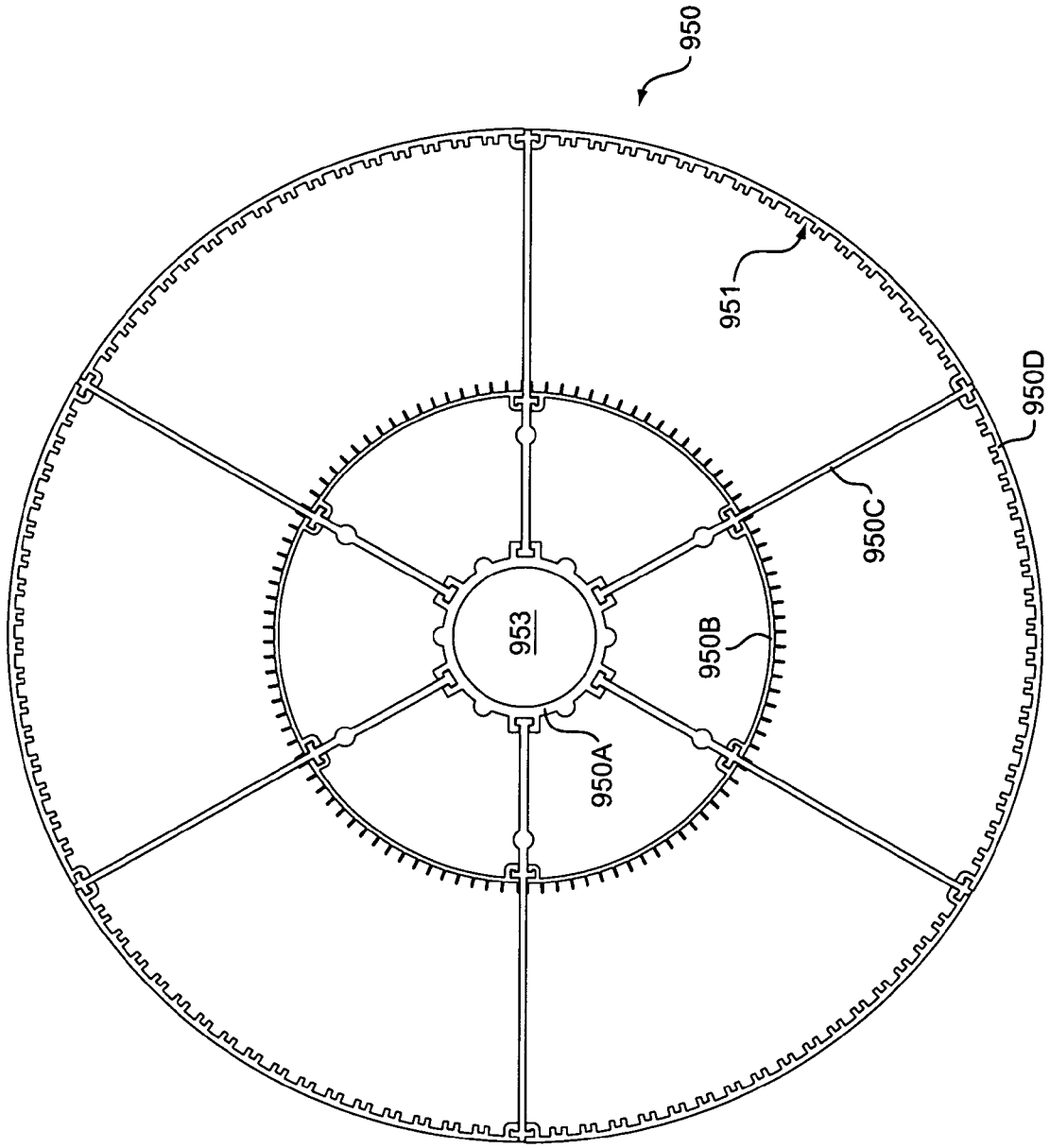
FIG. 18 shows a front view of a carousel of the invention.
Figure 19:
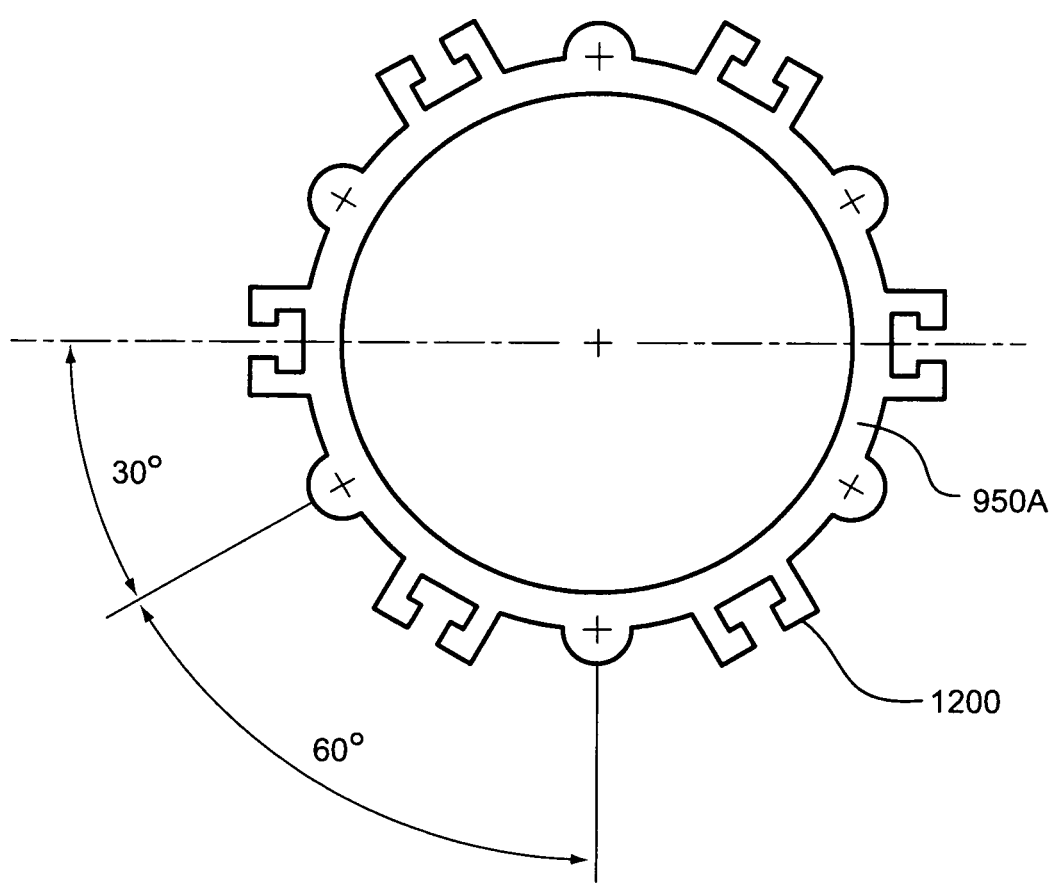
FIGS. 19-22 illustrate additional detail of parts extruded in making the carousel of FIG. 18.
Figure 20:
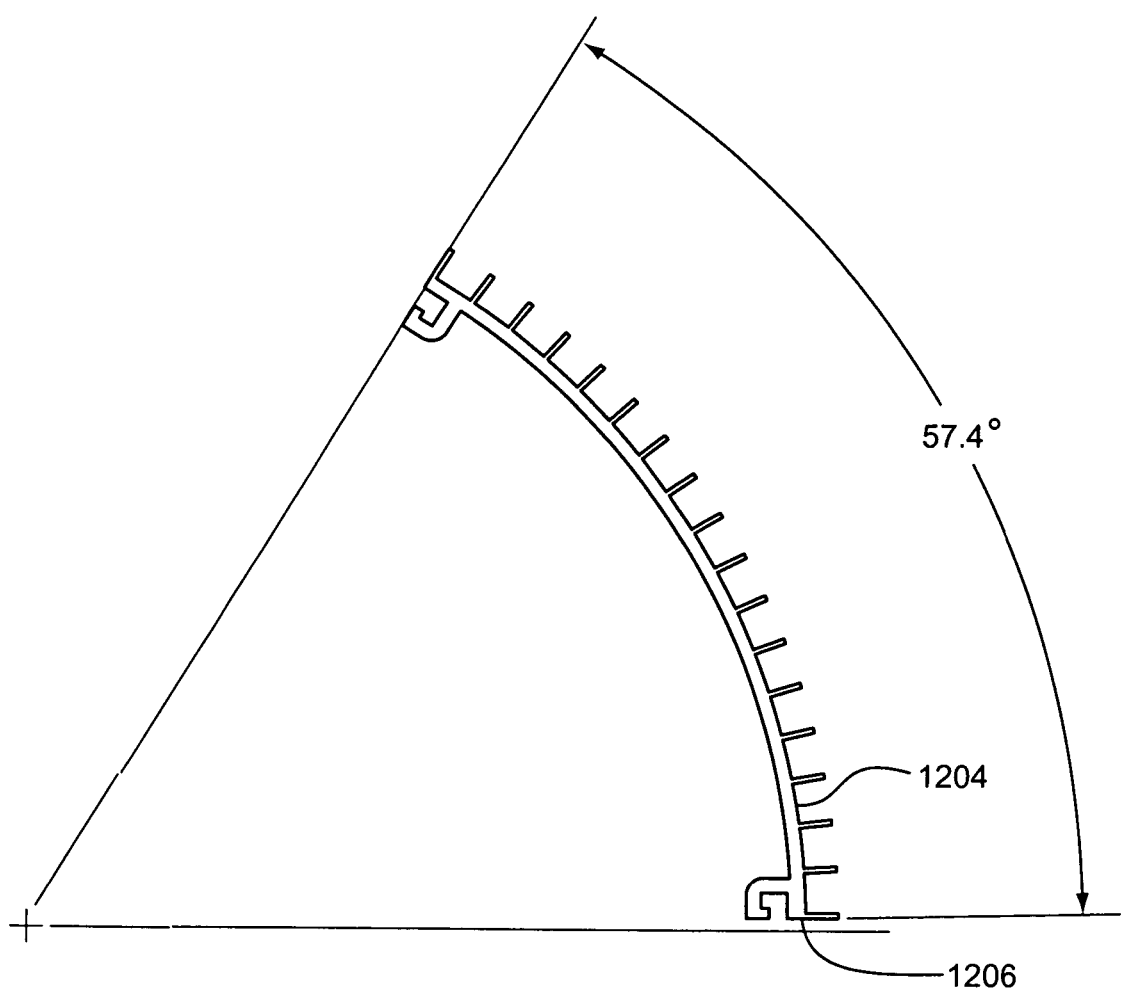
Figure 21:
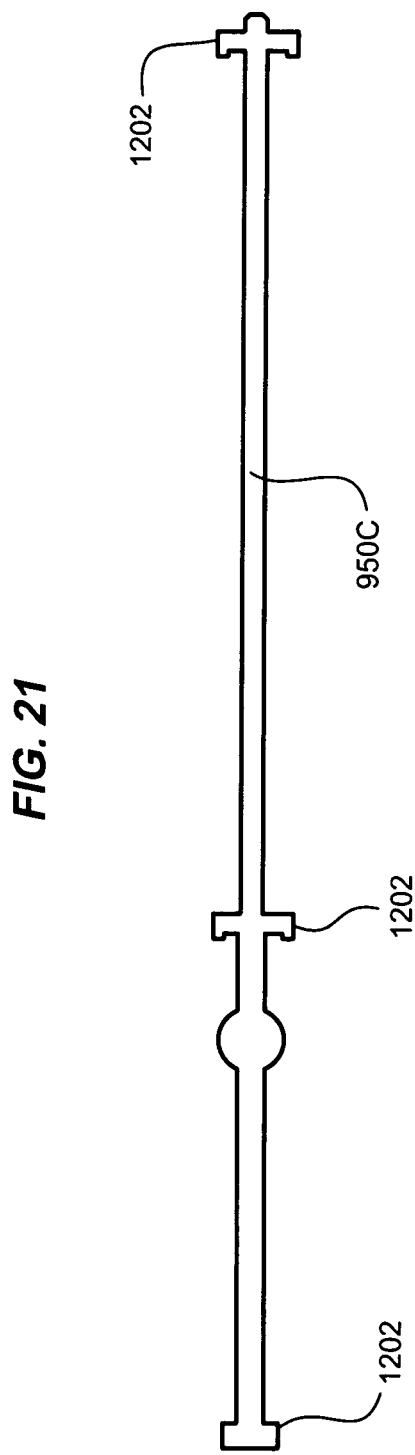
Figure 22:
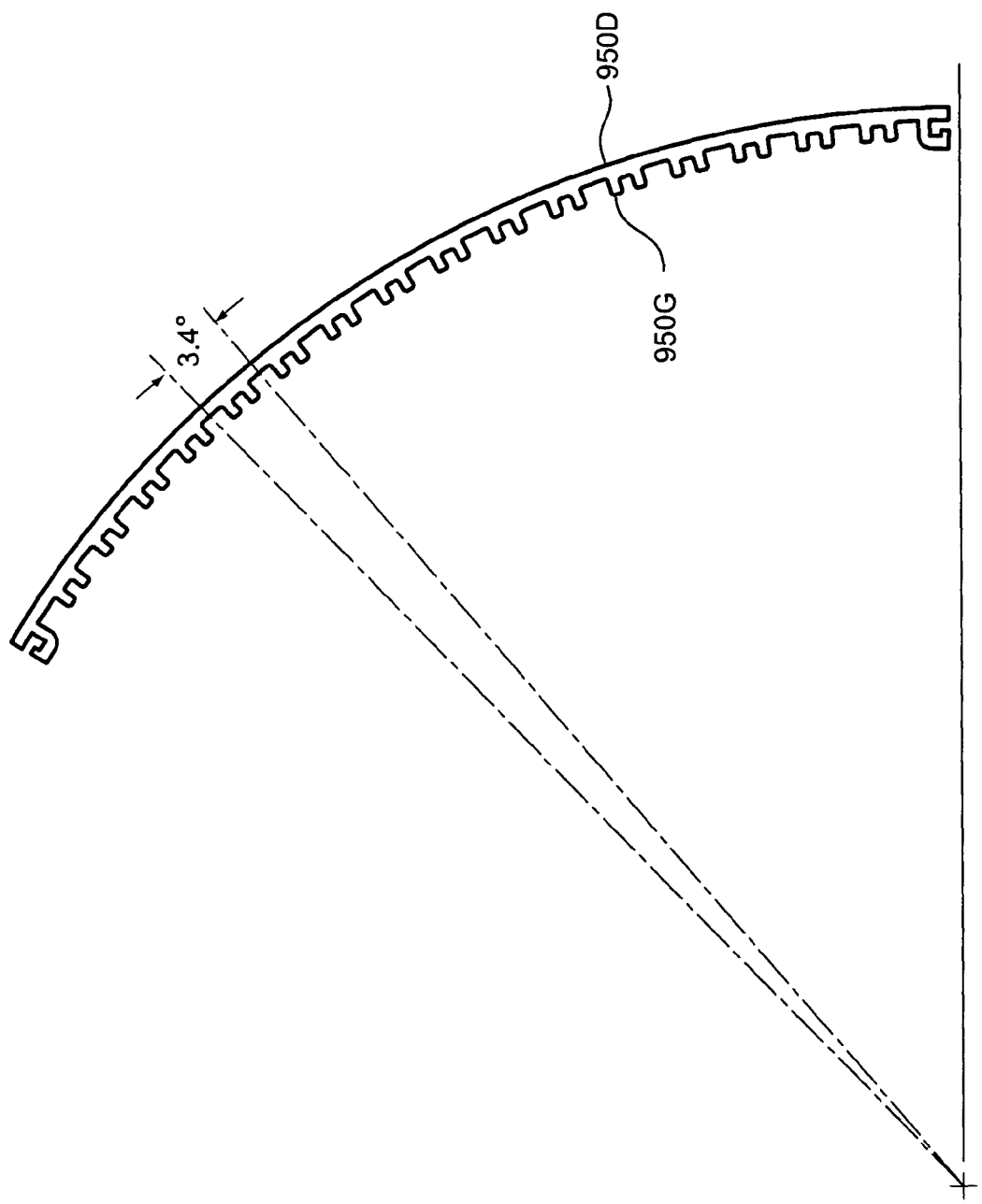

FIG. 18 shows a front view of carousel 950. Carousel 950 is preferably extruded as a series of parts shown in detail within FIGS. 19-22. FIG. 19 shows the center extrusion hub 950a. FIG. 20 shows the inner ring extrusion 950b. FIG. 21 shows the spoke extrusion 950c. FIG. 22 shows the outer ring extrusion 950d. Carousel 950 is thus extruded in three main sections: (1) the center extrusion hub 950a has the inside portion 1200 of the disk alignment fins and slots for the spoke extrusions 950c; (2) the spoke extrusions 950c are notched at 1202 to align with the slots in the center extrusion hub 950a and ring extrusions 950b, 950d; and (3) outer ring extrusion 950d contains outside disk alignment fins 1204 and is also slotted at 1206 to accept spoke extrusions 950c. The finished outer ring extrusion consists of six sections 950d welded together with six spoke extrusions 950c to complete carousel 950.

Figure 23:
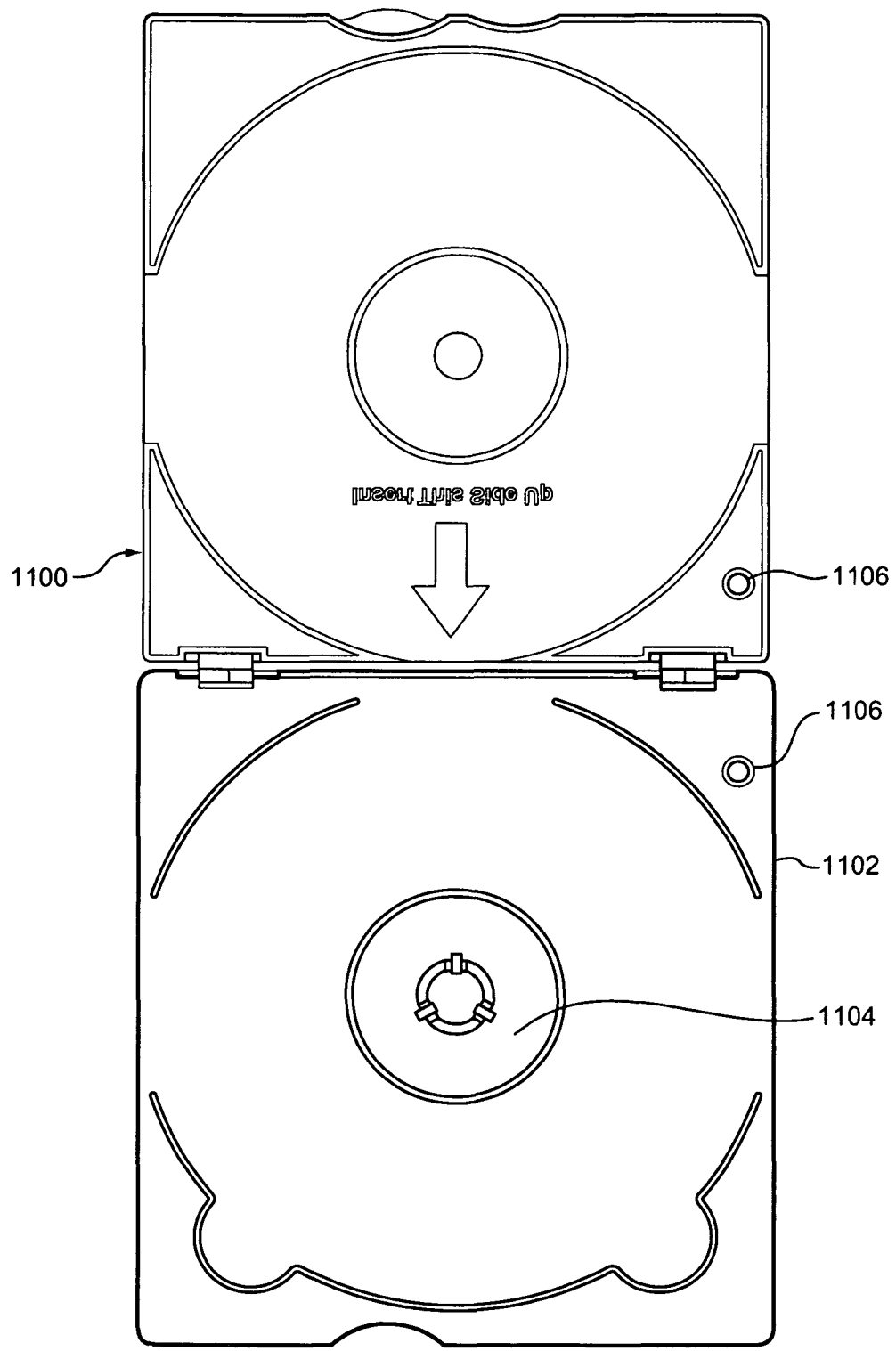
FIGS. 23-24 show a case for enclosing an optical recorded media, in accord with the invention.
Figure 24:
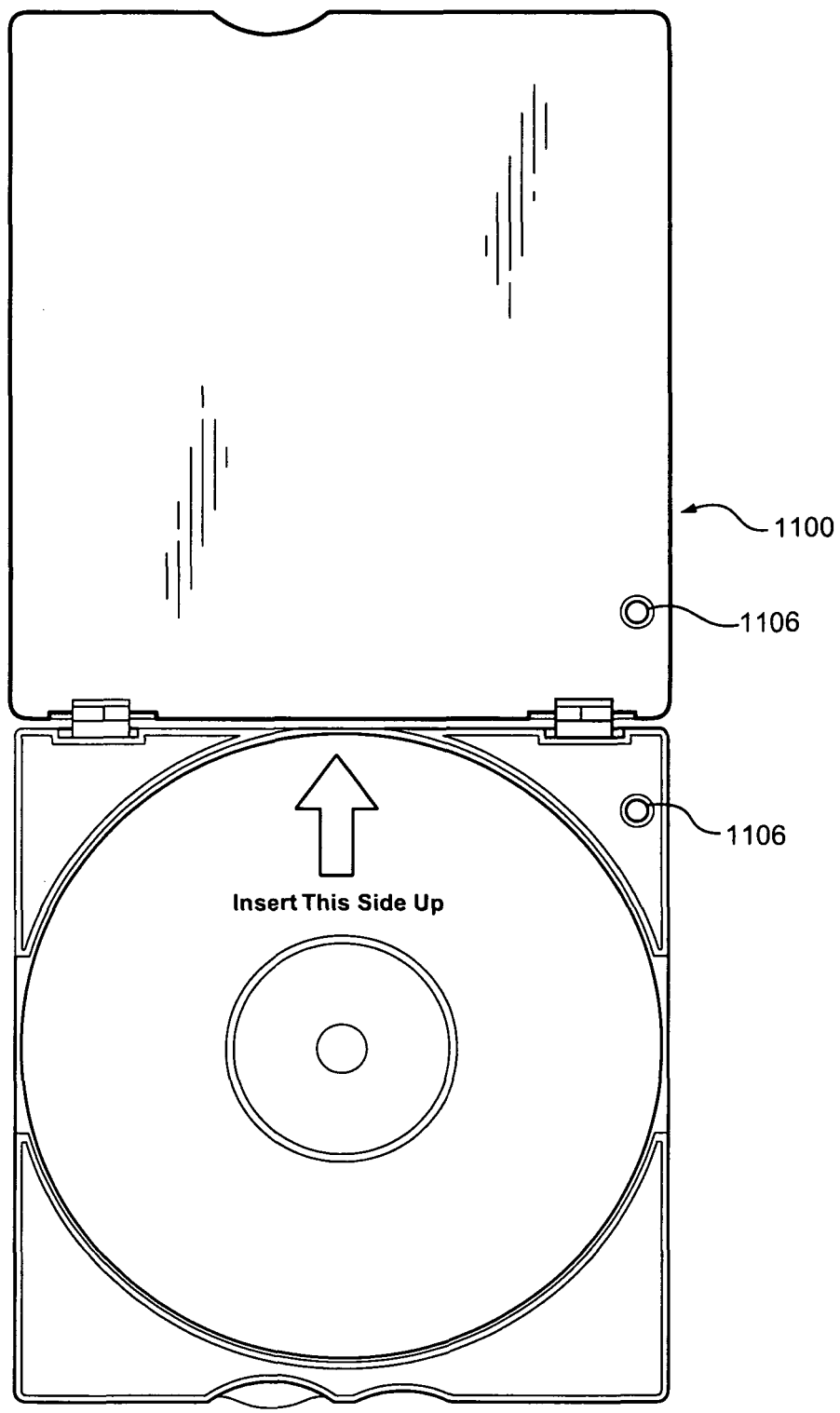
Figure 25:
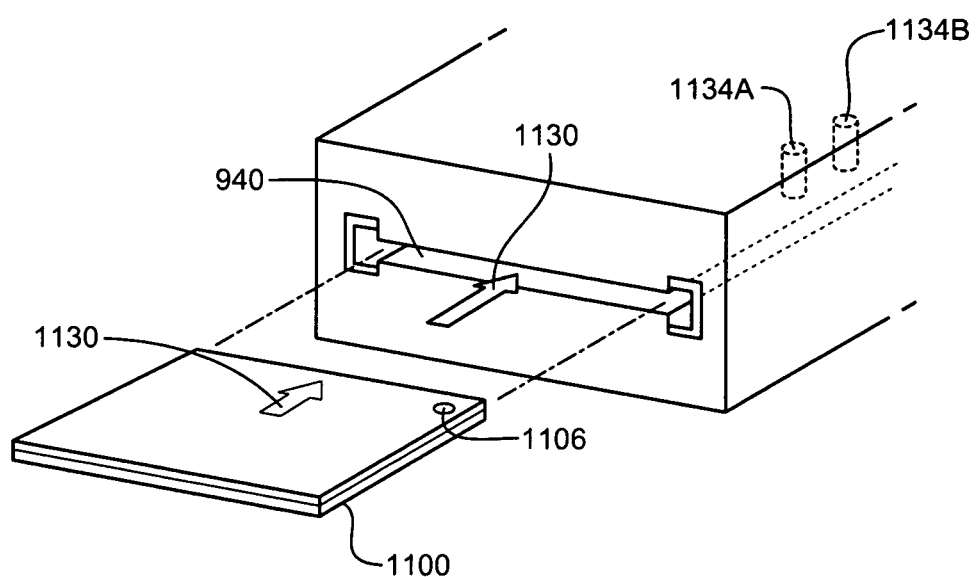
FIG. 25 illustrates operation for inserting a disk case into a kiosk, in accord with the invention.

FIG. 23 shows an inside view of one case 1100 suitable for housing optical recorded media for input and output with a kiosk 100 such as described in connection with FIGS. 8-17. FIG. 24 shows an outside view of case 1100. FIG. 7 shows case 1100 in a closed position, housing disk 700. FIG. 25 illustrates case operation through intake slot 940. A disk 700 sits within insert molds 1102 and around central hub 1104. Case 1100 has a hole 1106 used by sensors 1034 to detect whether case 1100 is suitably keyed for kiosk 200, FIG. 2. Intake Slot 940 is shaped to align case 1100 with sensors 1034, FIG. 16, in the kiosk intake housing. An example of keying is as follows: one sensor 1034A is aligned with hole 1106, providing an "open position", and the 2nd sensor 1034B is blocked by the case 1100 in a "closed position". Arrows 1130 indicate common direction for the case 1100 inserted into slot 940.

In operation, the intake mechanisms of kiosk 200 preferably operate according to the following steps:

After dispensing a disk, carousel 950, FIG. 11, is rotated such that an available return position is adjacent the input/output slot 940, FIG. 8; the return position being a slot 951 that does not contain a disk 700.

To initiate a return, a "return rental" button is triggered at the touch screen display 904, FIG. 8.

A disk 700 within a case 1100 is inserted into the intake slot 940, FIG. 8, until it reaches a door stop 1032; at this position, sensors 1034 on case 1100 are read to activate the barcode scanning process.

Barcode 701, FIG. 7, is read: the barcode image is scanned to acquire the appropriate code response; if the code is not acquired, the image is rotated 30o and is re-scanned; this cycle is repeated until the codes are acquired, or for a maximum of three cycles. Once the code is decoded, bar code 701A, FIG. 7, is read to determine which group code disk 700 is associated with; if cleared, kiosk door 1032, FIG. 16, is opened by rotating cam shaft 1048. The group code 701A identifies the disk as originating from a specific "kiosk group". Door 1032 is opened if the kiosk is associated with the group code. Concurrently, the kiosk reads a serialized code from bar code 701B to identify the individual disk 700 and to register it with the disk inventory database. The inventory database information is eventually relayed to core server 103, FIG. 1.

If a disk is accepted, the cam motor rotates camshaft 1048 to unblock door 1032 and then to clamp rollers 1018, FIG. 15, onto the case. The intake roller motor is activated to pull the case into a carousel slot 951. The camshaft continues to rotate to prep the door block spring. At the end of the intake motion, the case clears the door and allows the door block spring to move the intake block into a closed position. The intake rollers complete the transport of the disk into a free carousel slot 951.

A rear slot sensor 986, FIG. 13, verifies the existence of a case in the slot and sensor 990 verifies the completed transport of the case through the intake rollers 1018, FIG. 15, and into carousel 950.

A transaction finishes with the insertion of the serialized disk information into database tables.

In operation, kiosk 200 has a resting state that performs the following steps:

Door 1032 is locked.
Eject arm 976, FIG. 13, is in a read position.
Carousel 950 is held at an open slot 951.
Rollers 1018 are opened.

In operation, kiosk 200 preferably operates to accept returns (e.g., recorded disk media 700, FIG. 7, in a case 1100, FIGS. 23-24) according to the following sequential steps and/or states:

Kiosk 200 is in a resting state.
A return-rental button is triggered by a user of the kiosk, by pressing a graphical representation of the button on touch screen 904. The return-rental button triggers activation of the light for camera 1000.
A user inserts a disk 700, within a case 1100, to slot 940.
Kiosk case sensor reads case 1100.
Kiosk reads disk bar code 701.
Kiosk rollers 1018 close.
Kiosk door 1032 opens.
Intake roller 1018 on.
Door 1032 ready to close.

Case-in switch 990 read.
Rollers 1018 stop.
Door 1032 closes and locks.
Eject arm 976 retracts.
Carousel 950 moves to open position.
Rollers 1018 open.
Eject arm 976 moves to read position.
Kiosk in resting state.

In operation, kiosk 200 preferably operates in a rental transaction according to the following sequential steps and/or states:

Kiosk in resting state.
Sensors 1034A and 1034B checked for intake blockage.
Eject arm 976 retracts.
Carousel 950 moves to position.
Door 1032 opens.
Disk 700 ejected.
Rollers 1018 close.
Output roller 1018 on.
Disc 700 in case 1100 removed.
Door 1032 closes and locks
Carousel 950 moves to open slot 951.
Eject arm 976 moves to read position.
Kiosk 200 in resting state The above is a description of a method and system for Internet-based automated disk distribution and retrieval. It is expected that others will design alternative methods and systems for Internet-based disk distribution using stand-alone automated kiosks as set forth in the claims below either literally of through the Doctrine of Equivalents.

What is claimed is:

1. A coordinated kiosk system for distributing optical recorded media to users at a plurality of locations, a central server controlling the system, the system comprising:
   a first kiosk for storing, dispensing and receiving optical recorded media;
   a processor controlling the first kiosk in communication with the central server;
   an inventory database comprising inventory information of optical recorded media within the first kiosk; and
   a second kiosk for storing, dispensing and receiving optical recorded media, the second kiosk remote from the first kiosk, the second kiosk comprising:
      a user interface for accepting a user input, including a request for optical recorded media;
      a processor controlling the second kiosk in communication with the central server and configured for querying the inventory database when the requested optical recorded media is not contained within the second kiosk; and
      a display for displaying a location of the first kiosk to the user when the requested optical recorded media is located in the inventory of optical recorded media within the first kiosk,
   wherein the central server comprises the inventory database, and
   wherein at least the second kiosk comprises an internal memory for backing up the inventory information stored in the inventory database of the central server, said inventory information including real-time inventory of the first and second kiosks, such that inventory information of the first and second kiosks may be directly accessed by a user at the second kiosk without having to communicate with the central server.

2. The system of claim 1, the user interface comprising a reader for scanning user authorization information.

3. The system of claim 2, the reader comprising a magstripe reader for reading one or more of a user identification number, a credit card number, a club card number and a debit card number.

4. The system of claim 1, the user interface comprising a touch screen.

5. The system of claim 1, further comprising a transaction database for profiling user transactions.

6. The system of claim 1, the first kiosk comprising a rotatable carousel with a plurality of slots for housing the optical recorded media.

7. The system of claim 6, further comprising a motor for rotating the carousel.

8. The system of claim 7, further comprising a case presence sensor for detecting whether a case containing the optical recorded media is within a slot of the carousel.

9. The system of claim 7, further comprising an input/output mechanism for dispensing and receiving optical recorded media between the slots of the carousel and a user-accessible door of the first kiosk, wherein the carousel rotates in response to commands by the processor to align a slot housing the requested optical recorded media with the input/output mechanism.

10. The system of claim 9, the input/output mechanism comprising feedback sensor and an eject arm, the feedback sensor sensing position of the eject arm for dispensing or retrieving optical media through the input/output mechanism.

11. The system of claim 1, one or both of the first and second kiosks comprising a case sensor for sensing characteristics of a case housing a returned optical recorded media.

12. The system of claim 11, the case sensor configured for sensing one or more holes and one or more blocked regions in the case, the processor determining whether the case may be accepted within an input/output mechanism in the kiosk and between the slots of the carousel and a user-accessible door in a housing of the kiosk, based on signals from the first case sensor.

13. The system of claim 11, further comprising a case sensor light for illuminating light through a case containing a returned optical recorded media, the processor determining whether the case may be accepted within an input/output mechanism in the kiosk and between the slots of the carousel and a user-accessible door in a housing of the kiosk, based on signals from the first case sensor.

14. The system of claim 1, one or both of the first and second kiosks comprising a digital camera for capturing a digital image of a returned optical media.

15. The system of claim 14, one or both of the first and second kiosks further comprising a scanner for electronically scanning the digital image to decode one or more bar codes on the returned optical recorded media, the processor determining whether the case may be accepted within an input/output mechanism in the first or second kiosk, between the slots of the carousel and a user-accessible door in a housing of the first or second kiosk, based on signals from the scanner.

16. The system of claim 15, one or both of the first and second kiosks further comprising internal software for rotating a scanned digital image if the processor fails to decode the bar codes, the scanner configured for re-scanning the rotated digital image.

17. The system of claim 1, further comprising an alarm state recognition device alarm for recognizing and indicating an alarm state associated with the first or second kiosk.

* * * * *

UNITED STATES PATENT AND TRADEMARK OFFICE
CERTIFICATE OF CORRECTION

PATENT NO.        : 8,626,614 B2
APPLICATION NO.   : 11/584865
DATED             : January 7, 2014
INVENTOR(S)       : William H. Barber et al.

It is certified that error appears in the above-identified patent and that said Letters Patent is hereby corrected as shown below:

In the Specification

In column 5, line 7, delete "data" and insert -- data. --, therefor.

In column 12, line 60, delete "FIGS. 9-18" and insert -- FIGS. 9-18. --, therefor.

In column 16, line 18, delete "30o" and insert -- 30° --, therefor.

In column 17, line 21, delete "locks" and insert -- locks. --, therefor.

In column 17, line 24, delete "state" and insert -- state. --, therefor.

Signed and Sealed this
Fifteenth Day of July, 2014

Michelle K. Lee
*Deputy Director of the United States Patent and Trademark Office*